United States Patent
Otaka et al.

(10) Patent No.: US 12,236,455 B2
(45) Date of Patent: Feb. 25, 2025

(54) COMMUNICATION DEVICE, COMPUTER-READABLE STORAGE MEDIUM, AND SYSTEM

(71) Applicant: HONDA MOTOR CO.,LTD., Tokyo (JP)

(72) Inventors: Masaru Otaka, Saitama (JP); Ryusuke Tamanaha, Saitama (JP); Ryo Saiki, Saitama (JP); Yusuke Oi, Tokyo (JP); Takahiro Iijima, Tokyo (JP); Naoko Imai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 985 days.

(21) Appl. No.: 17/179,441

(22) Filed: Feb. 19, 2021

(65) Prior Publication Data

US 2021/0272162 A1 Sep. 2, 2021

(30) Foreign Application Priority Data

Feb. 28, 2020 (JP) ................................. 2020-034274

(51) Int. Cl.
*H04W 4/44* (2018.01)
*G06Q 30/0251* (2023.01)
(Continued)

(52) U.S. Cl.
CPC ..... *G06Q 30/0269* (2013.01); *G06Q 30/0261* (2013.01); *G06Q 30/0267* (2013.01);
(Continued)

(58) Field of Classification Search
CPC .......... G06Q 30/0269; G06Q 30/0261; G06Q 30/0267; H04W 4/44; H04W 4/46;
(Continued)

(56) References Cited

U.S. PATENT DOCUMENTS 10,305,576 B2 5/2019 High
10,970,747 B2 4/2021 Miller
(Continued)

FOREIGN PATENT DOCUMENTS

CN 103561386 A 2/2014
CN 105430081 A 3/2016
(Continued)

OTHER PUBLICATIONS

Office Action issued for counterpart Chinese Application 202011458958.7, issued by the State Intellectual Property Office of People's Republic of China on May 13, 2023.
(Continued)

*Primary Examiner* — Marcus Hammonds

(57) ABSTRACT

Provided is a communication device including: a first receiving unit configured to receive distribution information from a second moving object that is different from a first moving object on which the communication device is mounted; a storage unit configured to store the distribution information; a transmission unit configured to transmit the distribution information to a third moving object that is different from the first moving object; and a communication relay unit configured to relay a communication between an external terminal located outside the first moving object, and an external network, in which the distribution information includes a restriction condition for restricting the transmission of the distribution information, and when the transmission unit determines that the transmission of the distribution information to the third moving object is not restricted based on the restriction condition, the transmission unit transmits the distribution information to the third moving object.

18 Claims, 14 Drawing Sheets

(51) Int. Cl.
*H04W 4/46* (2018.01)
*H04W 84/00* (2009.01)

(52) U.S. Cl.
CPC ............... *H04W 4/44* (2018.02); *H04W 4/46* (2018.02); *H04W 84/005* (2013.01)

(58) Field of Classification Search
CPC ..... H04W 84/005; H04W 4/23; H04W 4/021; H04W 4/027; H04W 4/80; H04W 28/0226; H04W 52/0209; H04W 88/04
See application file for complete search history.

(56) References Cited

U.S. PATENT DOCUMENTS

| | | | |
|---|---|---|---|
| 2014/0244385 A1* | 8/2014 | Choi | G06Q 30/0261 705/14.58 |
| 2017/0032402 A1* | 2/2017 | Patsiokas | G06Q 30/0207 |
| 2018/0053215 A1* | 2/2018 | e Costa | G06Q 30/0267 |
| 2019/0239155 A1 | 8/2019 | Ushida | |
| 2019/0347690 A1* | 11/2019 | Suzuki | G06Q 30/0255 |
| 2020/0043058 A1 | 2/2020 | Takemura | |

FOREIGN PATENT DOCUMENTS

| | | |
|---|---|---|
| CN | 108540927 A | 9/2018 |
| JP | 2004274301 A | 9/2004 |
| JP | 2005176066 A | 6/2005 |
| JP | 2005252755 A | 9/2005 |
| JP | 2017199122 A | 11/2017 |
| JP | 2017228930 A | 12/2017 |
| JP | 2018526749 A | 9/2018 |
| JP | 2019521536 A | 7/2019 |
| JP | 2019197331 A | 11/2019 |
| WO | 2018021116 A1 | 2/2018 |

OTHER PUBLICATIONS

Office Action issued for counterpart Japanese Application No. 2020-034274, transmitted from the Japanese Patent Office on Sep. 19, 2023 (drafted on Sep. 11, 2023).

* cited by examiner

COMMUNICATION DEVICE, COMPUTER-READABLE STORAGE MEDIUM, AND SYSTEM

The contents of the following Japanese application are incorporated herein by reference: NO. 2020-034274 filed in JP on Feb. 28, 2020.

BACKGROUND

1. Technical Field

The present invention relates to a communication device, a computer-readable storage medium, and a system.

2. Related Art

Patent Document 1 discloses that autonomous vehicles such as UAVs or automobiles provide network access points. Patent Document 2 discloses a system that receives data from interior occupant sensing systems of vehicles and analyzes the data to provide advertising on a billboard display that is directed toward the occupants of the vehicles.

CITATION LIST

Patent Documents

[Patent Document 1] Japanese Translation of PCT International Application Publication No. 2019-521536
[Patent Document 2] Japanese Translation of PCT International Application Publication No. 2018-526749

DESCRIPTION OF EXEMPLARY EMBODIMENTS

Hereinafter, the invention will be described through embodiments of the invention, but the following embodiments do not limit the invention according to claims. Further, not all of the combinations of features described in the embodiments are essential for means to solve the problem in the invention.

Figure 1:
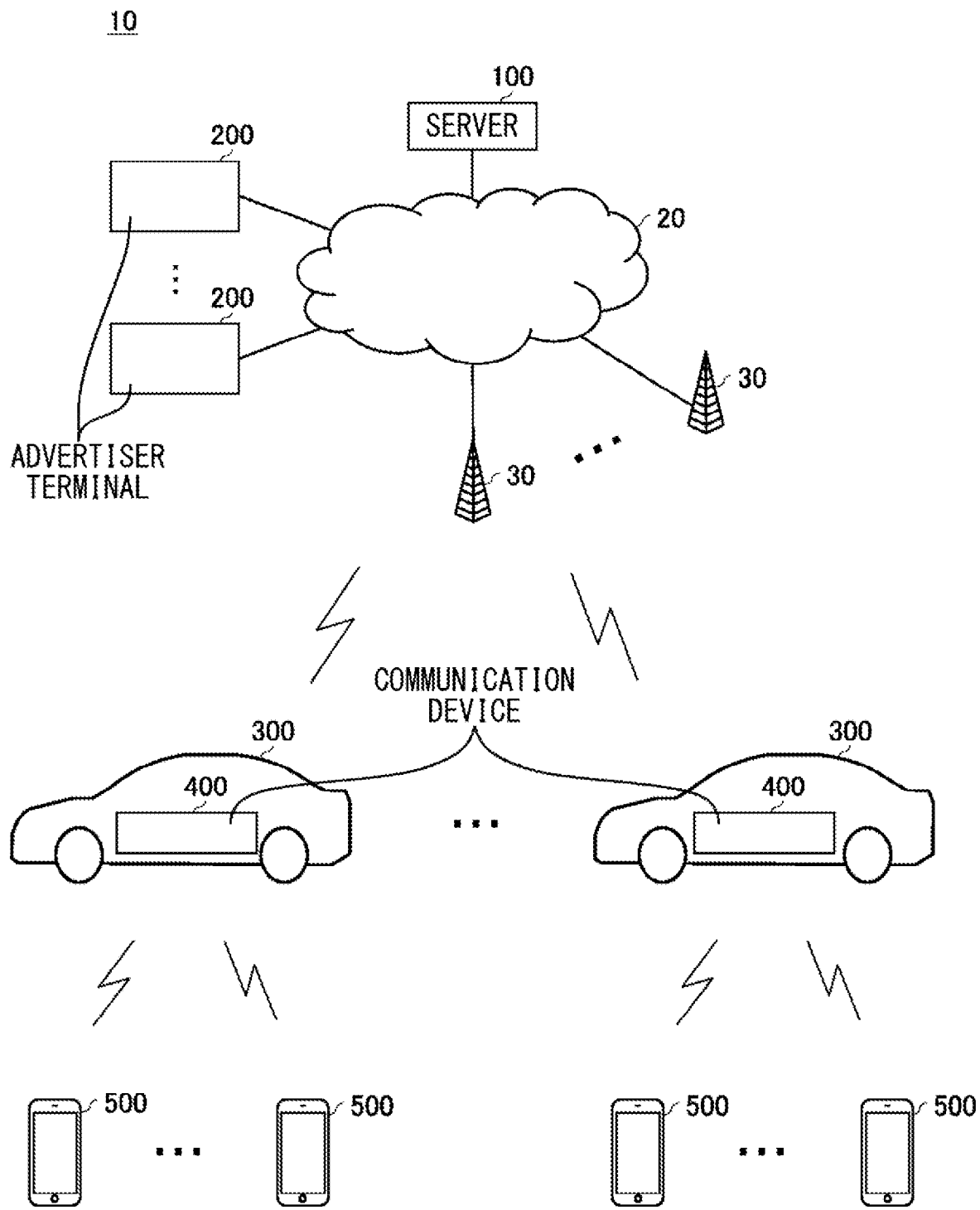
FIG. 1 schematically shows an example of a system 10.

FIG. 1 schematically shows an example of a system 10. The system 10 includes a communication device 400. The system 10 may include a vehicle 300. The system 10 may include a server 100. The system 10 may include an advertiser terminal 200. The system 10 may include a communication terminal 500.

The communication device 400 is mounted on the vehicle 300. The vehicle 300 may be an example of a moving object. Examples of the moving object include an unmanned aerial vehicle or the like in addition to the vehicle 300.

The vehicle 300 may be an automobile. The vehicle 300 may be any type of automobile. The vehicle 300 may be a gasoline vehicle or may be a so-called eco-car. Examples of the type of eco-car include HV (Hybrid Vehicle), PHEV/PHV (Plug-in Hybrid Vehicle), EV (Electric Vehicle), FCV (Fuel Cell Vehicle), and the like. The vehicle 300 is, for example, a private vehicle. Note that the vehicle 300 may be an automobile for any purpose. For example, the vehicle 300 may be a business vehicle such as a taxi, a bus, or a mobile sales vehicle. Further, the vehicle 300 may be a vehicle that autonomously travels, or may be a vehicle that has an autonomous driving mode.

The communication device 400 has a so-called cellular communication function. An antenna for a cellular communication may be included in the communication device 400, or may also be included in the vehicle 300 on which the communication device 400 is mounted. The communication device 400 uses a cellular communication system to establish a wireless communication connection with a wireless base station 30 and access a network 20 via the wireless base station 30. The network 20 includes a cellular network. The network 20 may include the Internet. The network 20 may be an example of an external network.

The wireless base station 30 may be based on any cellular communication system. The wireless base station 30 is, for example, based on an LTE (Long Term Evolution) communication system. The wireless base station 30 is, for example, based on a 3G (3rd Generation) communication system. The wireless base station 30 is, for example, based on a 5G (5th Generation) communication system. The wireless base station 30 is, for example, based on a cellular communication system that is a 6G (6th Generation) communication system and beyond. Here, a case where the wireless base station 30 is based on the LTE communication system will be mainly described as an example.

The communication device 400 has a function of wirelessly communicating with the communication terminal 500. The communication device 400 has, for example, a Wi-Fi (registered trademark) (Wireless Fidelity) communication function. An antenna for a Wi-Fi communication may be included in the communication device 400, or may also be included in the vehicle 300 on which the communication device 400 is mounted.

The communication terminal 500 may be any terminal having a wireless communication unit and a display unit. The communication terminal 500 is, for example, a mobile phone such as a smartphone. The communication terminal 500 may be a tablet terminal. The communication terminal 500 may be a wearable terminal such as a glasses-type device. The communication terminal 500 may be an example of an external terminal. Here, the outside of the moving object does not necessarily have to be outside of the moving object, and the external terminal may be used on the inside of the moving object by being brought into the moving object. The communication terminal 500 only needs to be portable for an owner of the communication terminal 500, and to execute a unique communication which is different, in content, from the communication of the communication device 400.

The communication device 400 has a function of directly communicating with another moving object. For example, the communication device 400 has a vehicle-to-vehicle communication function. The vehicle-to-vehicle communication may be an example of a communication between moving objects. When the communication device 400 is mounted on an unmanned aerial vehicle, the communication device 400 may have a function of communicating between unmanned aerial vehicles.

The communication device 400 can communicate with another communication device 400 mounted on a vehicle 300 that is different from the vehicle 300 on which the communication device 400 is mounted. The communication device 400 communicates with another communication device 400 by, for example, a DSRC (registered trademark) (Dedicated Short Range Communications) communication system. An antenna for DSRC may be included in the communication device 400, or may also be included in the vehicle 300 on which the communication device 400 is mounted. The communication device 400 may communicate with another communication device 400 by a Wi-Fi communication system or a Bluetooth (registered trademark) communication system. Further, the communication device 400 can communicate with a roadside unit that has a communication function and is installed on a path. In this case, for example, the communication device 400 may communicate with the roadside unit by the DSRC communication system, the Wi-Fi communication system, or the Bluetooth communication system.

The communication device 400 has a communication relay function of relaying a communication between the network 20 and the communication terminal 500. The communication device 400 or the vehicle 300 may function as a so-called Wi-Fi hotspot. For example, the communication terminal 500 establishes a wireless communication connection with the communication device 400 of the vehicle 300 that is stopped or parked, to access the network 20 via the communication device 400 and the wireless base station 30. The communication terminal 500 may establish a wireless communication connection with the communication device 400 of the vehicle 300 that is traveling.

In this way, the communication device 400 mounted on the vehicle 300 functions as a Wi-Fi hotspot so that a Wi-Fi communication service can be provided to many communication terminals 500. However, typically, in the cellular communication between the communication device 400 and the wireless base station 30, a pay-as-you-go system or a fixed packet rate system is adopted, thus if no care is taken, financial burdens on a subscriber of the cellular communication and an owner of the vehicle 300 increase depending on a volume of the relayed communication.

In contrast, in the system 10 according to the present embodiment, an advertisement distribution service for the communication terminal 500 by the communication device 400 is achieved. For example, the server 100 receives a distribution request for distribution information from the advertiser terminal 200, and distributes the distribution information to the communication terminal 500 via the vehicle 300. The distribution information may be, for example, advertisement information or recommendation information. The advertiser terminal 200 may be a terminal used by an advertiser who desires to distribute the distribution information. The advertiser terminal 200 may be a mobile phone such as a smartphone, a tablet terminal, a PC (Personal Computer), and the like. By distributing advertising revenue to the owner of the vehicle 300 involved in the distribution of the distribution information, the owner of the vehicle 300 can be given an incentive to provide the Wi-Fi hotspot.

In particular, in the system 10 according to the present embodiment, the distribution information is transmitted to a specific vehicle 300 among a plurality of vehicles 300, and then the distribution information is forwarded from the vehicle 300 to another vehicle 300 by the vehicle-to-vehicle communication. The vehicle-to-vehicle communication has a lower communication cost in comparison with the cellular communication. Typically, in the vehicle-to-vehicle communication, the pay-as-you-go system or the like is not adopted, thus even when the communication volume increases, the financial burden on the owner of the vehicle 300 does not increase. Therefore, in comparison with a case where the distribution information is transmitted from the server 100 to a plurality of vehicles 300 by the cellular communication, the communication cost can be reduced by using the vehicle-to-vehicle communication.

Figure 2:
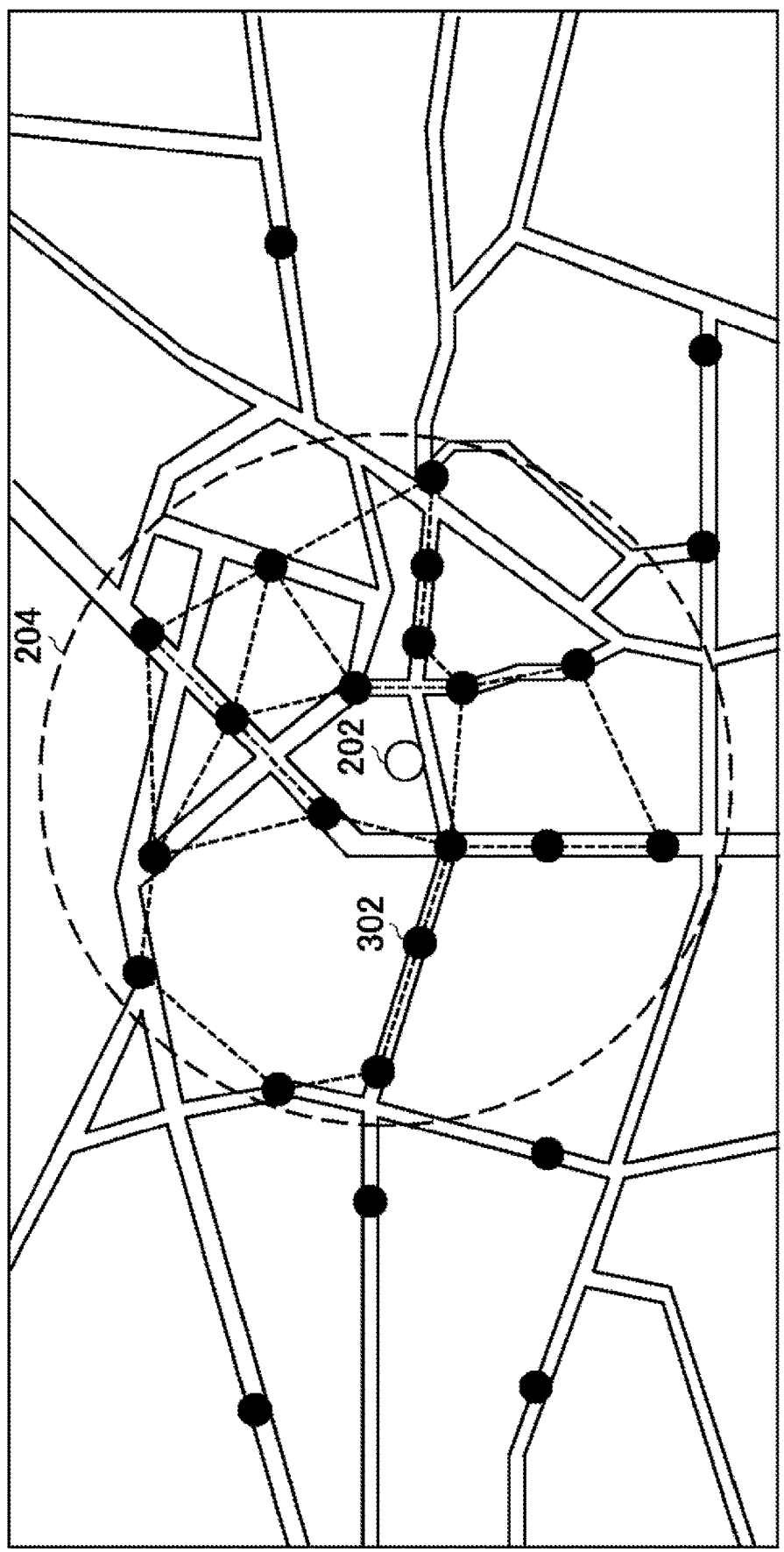
FIG. 2 schematically shows an image of an advertisement distribution by the system 10.

FIG. 2 schematically shows an image of an advertisement distribution by the system 10. An advertising base point 202 indicates a location relating to an advertisement. For example, when the advertiser runs a store or the like, the advertising base point 202 may indicate a location of the store. Further, for example, when the advertiser organizes an event, the advertising base point 202 may indicate a venue for the event.

The advertising base point 202 may indicate a geographic region relating to the advertisement. For example, when the advertiser runs a store or the like, the advertising base point 202 may indicate a geographic region of the store. Further, for example, when the advertiser organizes an event, the advertising base point 202 may indicate a geographic region of a venue for the event.

An advertising area 204 indicates an area where the advertiser desires to place the distribution information, in particular, the advertisement. FIG. 2 illustrates a case where the advertising area 204 is a circular area centering on the advertising base point 202; however, the present invention is not limited to this. The advertising area 204 may be an area of any shape. Further, the advertising area 204 may be a donut shaped distribution region having a non-target zone in the area. In this case, the non-target zone in the area may include the advertising base point 202. A vehicle location 302 indicates a location of the vehicle 300.

For example, the advertiser terminal 200 registers, in the server 100, an advertising content, information of the advertising base point 202, and information of the advertising area 204 to transmit the distribution request for the distribution information to the server 100. The advertising content may include text which indicates a content of the advertisement. The advertising content may include an image which indicates the content of the advertisement. The advertising content may include an audio relating to the content of the advertisement.

In response to the distribution request, the server 100 identifies, from among a plurality of vehicles 300 in the advertising area 204, one or more vehicles 300 targeted for transmitting the distribution information. The server 100 identifies, for example, the vehicle 300 that is closer to the advertising base point 202 from among a plurality of vehicles 300. The server 100 may identify the vehicle 300 according to an instruction given by the advertiser using the advertiser terminal 200. Further, the server 100 may identify the vehicle 300 based on a past distribution record of the distribution information of the vehicle 300.

The server 100 transmits the distribution information to the identified vehicle 300 via the network 20 and the wireless base station 30. The distribution information may include the advertising content. The distribution information may include the information of the advertising base point 202. The distribution information may include the information of the advertising area 204.

The vehicle 300 that has received the distribution information forwards the distribution information to another vehicle 300 by the vehicle-to-vehicle communication. The distribution information is forwarded, for example, by the vehicle 300 in the advertising area 204.

The vehicle 300 that has received the distribution information transmits the distribution information to the communication terminal 500. The vehicle 300 may transmit the distribution information to the communication terminal 500 with which the wireless communication connection has been established. This enables the distribution information to be distributed to the communication terminal 500 located in the advertising area 204.

Figure 3:
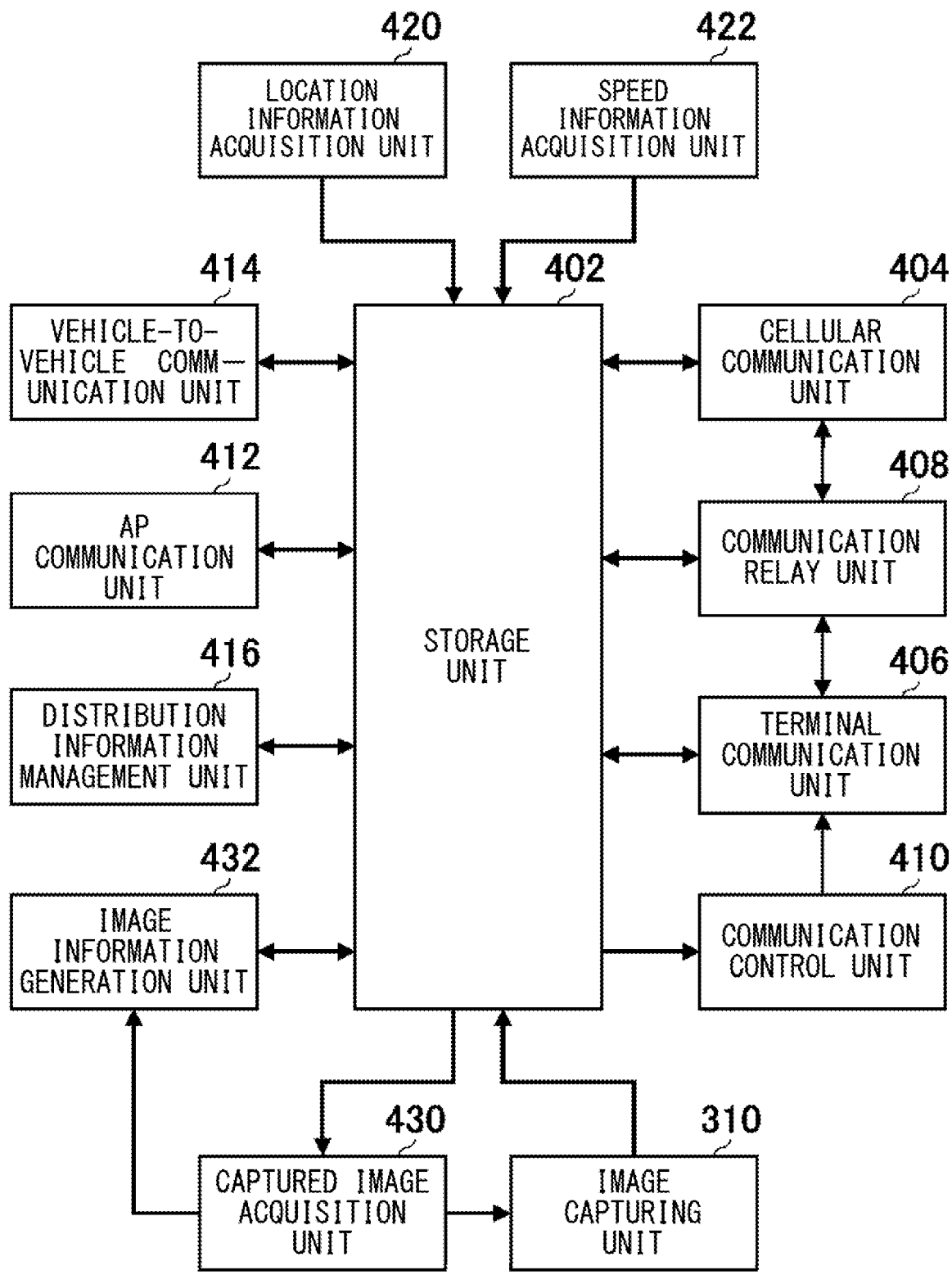
FIG. 3 schematically shows an example of a functional configuration of a communication device 400.

FIG. 3 schematically shows an example of a functional configuration of a communication device 400. The communication device 400 includes a storage unit 402, a cellular communication unit 404, a terminal communication unit 406, a communication relay unit 408, a communication control unit 410, an AP communication unit 412, a vehicle-to-vehicle communication unit 414, a distribution information management unit 416, a location information acquisition unit 420, a speed information acquisition unit 422, a captured image acquisition unit 430, and an image information generation unit 432. Note that it is not necessarily essential that the communication device 400 includes all of these. Further, a part of the configuration may be provided outside the communication device 400, for example, in the vehicle 300.

The storage unit 402 stores various types of information. The storage unit 402 stores, for example, the distribution information. Further, the storage unit 402 stores a captured image which is captured by an image capturing unit 310 that is included in the vehicle 300. The image capturing unit 310 is, for example, a dashboard camera. The image capturing unit 310 may be a camera installed in the vehicle 300 separately from the dashboard camera.

The cellular communication unit 404 wirelessly communicates with the wireless base station 30 by the cellular communication system. The cellular communication unit 404 accesses the network 20 via the wireless base station 30. The cellular communication unit 404 can receive the distribution information from the server 100 via the network 20 and the wireless base station 30 to store the distribution information in the storage unit 402. The cellular communication unit 404 may be an example of a receiving unit that receives the distribution information.

The terminal communication unit 406 wirelessly communicates with the communication terminal 500 located outside the vehicle 300. The terminal communication unit 406 may wirelessly communicate with the communication terminal 500 located on the inside of the vehicle 300. The terminal communication unit 406 may wirelessly communicate with the communication terminal 500 by the Wi-Fi communication system. The terminal communication unit 406 can transmit the distribution information stored in the storage unit 402 to the communication terminal 500. The terminal communication unit 406 may be an example of a transmission unit that transmits the distribution information to the communication terminal 500.

The communication relay unit 408 relays a communication between the communication terminal 500 and the network 20. For example, the communication relay unit 408 transmits, to the network 20 via the cellular communication unit 404, data which is received by the terminal communication unit 406 from the communication terminal 500. For example, the communication relay unit 408 transmits, to the communication terminal 500 via the terminal communication unit 406, data which is received by the cellular communication unit 404 from the network 20. The communication relay unit 408 may transmit the distribution information to the communication terminal 500 via the terminal communication unit 406.

The communication control unit 410 controls communication settings for communicating with the communication terminal 500. The communication control unit 410 controls, for example, a wireless communication area where the terminal communication unit 406 wirelessly communicates with the communication terminal 500. As a specific example, the communication control unit 410 controls a size of the wireless communication area where the terminal communication unit 406 wirelessly communicates with the communication terminal 500. Further, the communication control unit 410 controls, for example, the number of allowable connections by which the terminal communication unit 406 establishes the wireless communication connection with the communication terminal 500. Further, the communication control unit 410 controls, for example, an allowable connection time during which the terminal communication unit 406 establishes the wireless communication connection with the communication terminal 500. Further, the communication control unit 410 controls, for example, on/off of the relay function by the communication relay unit 408.

The AP communication unit 412 wirelessly communicates with an access point. The AP communication unit 412 wirelessly communicates, for example, with a Wi-Fi hotspot arranged in each location. The AP communication unit 412 may wirelessly communicates with a free Wi-Fi hotspot arranged in each location. Further, the AP communication unit 412 may wirelessly communicate with a roadside unit arranged in each location by the Wi-Fi communication system, the Bluetooth communication system, or the DSRC communication system. The roadside unit may be arranged in a traffic control system, for example, a traffic light.

The AP communication unit 412 may access the network 20 via the access point. The AP communication unit 412 can receive the distribution information from the server 100 via the network 20 and the access point to store the distribution information in the storage unit 402. The AP communication unit 412 may be an example of a receiving unit that receives the distribution information.

The vehicle-to-vehicle communication unit 414 executes the vehicle-to-vehicle communication. The vehicle-to-vehicle communication unit 414 may communicate with another communication device 400 by the DSRC communication system. The vehicle-to-vehicle communication unit 414 may communicate with another communication device 400 by the Wi-Fi communication system. The vehicle-tovehicle communication unit 414 may communicate with another communication device 400 by the Bluetooth communication system. The vehicle-to-vehicle communication unit 414 can receive the distribution information from another communication device 400 to store the distribution information in the storage unit 402. The vehicle-to-vehicle communication unit 414 may be an example of a receiving unit that receives the distribution information. The vehicle-to-vehicle communication unit 414 can transmit the distribution information stored in the storage unit 402 to another communication device 400. The vehicle-to-vehicle communication unit 414 may be an example of a transmission unit that transmits the distribution information to another vehicle.

The distribution information management unit 416 manages the distribution information stored in the storage unit 402. For example, the distribution information management unit 416 edits the distribution information.

The location information acquisition unit 420 acquires location information on a current location of the vehicle 300 (sometimes referred to as a host vehicle) on which the communication device 400 is mounted. The location information acquisition unit 420 acquires the location information of the host vehicle, for example, from a car navigation system of the host vehicle. When the communication device 400 has a positioning function such as GPS positioning, the location information acquisition unit 420 may acquire, as the location information of the host vehicle, a positioning result obtained by the positioning function.

The speed information acquisition unit 422 acquires speed information on a moving speed of the host vehicle. The speed information acquisition unit 422 may acquire speed information on a travel speed of the host vehicle. For example, the speed information acquisition unit 422 may acquire the speed information of the host vehicle from a speed sensor, an in-vehicle meter, and a car navigation system of the host vehicle, or may measure the speed information by the communication device 400.

The captured image acquisition unit 430 acquires the captured image obtained by the image capturing unit 310 capturing a location relating to the advertisement. The captured image acquisition unit 430 may acquire the captured image from the storage unit 402.

The image information generation unit 432 generates image information which includes at least any of the captured image obtained by capturing the location relating to the advertisement, and image-related information relating to the captured image. The image information generation unit 432 may store the generated image information in the storage unit 402.

Figure 4:
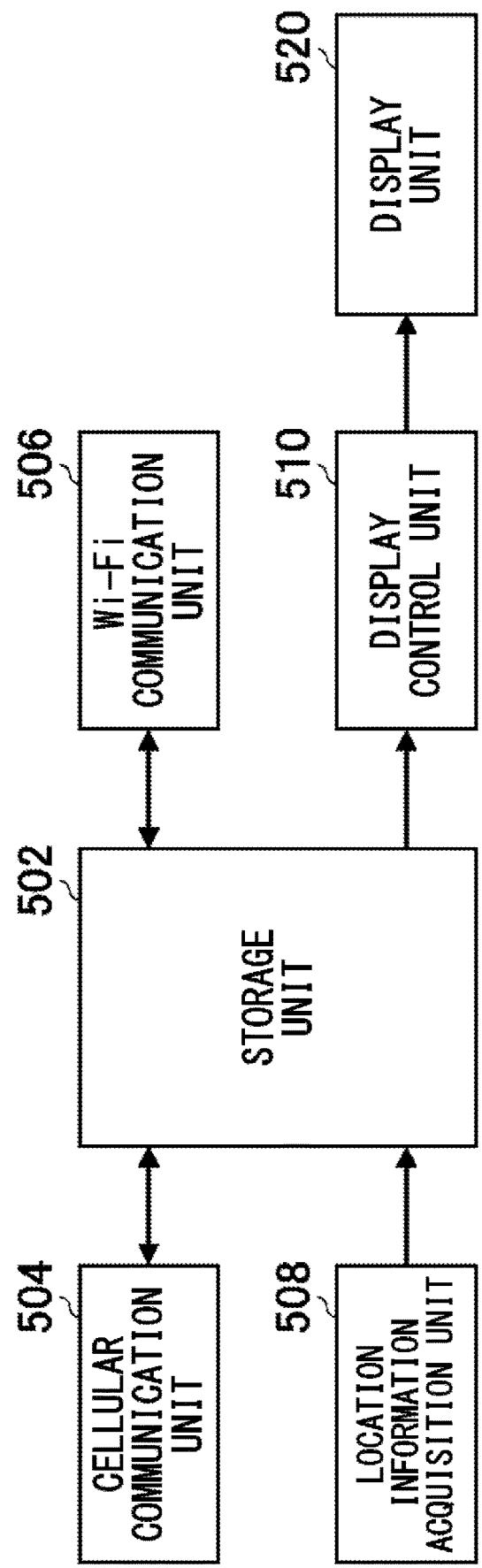
FIG. 4 schematically shows an example of a functional configuration of a communication terminal 500.

FIG. 4 schematically shows an example of a functional configuration of a communication terminal 500. The communication terminal 500 includes a storage unit 502, a cellular communication unit 504, a Wi-Fi communication unit 506, a location information acquisition unit 508, and a display control unit 510.

The storage unit 502 stores various types of information. The storage unit 502 stores, for example, the distribution information. The storage unit 502 may be an example of a terminal storage unit.

The cellular communication unit 504 wirelessly communicates with the wireless base station 30 by the cellular communication system. The cellular communication unit 504 accesses the network 20 via the wireless base station 30. The Wi-Fi communication unit 506 wirelessly communicates with the communication device 400 by the Wi-Fi communication system.

The location information acquisition unit 508 acquires location information on a current location of the communication terminal 500. The location information acquisition unit 508 may acquire a result of positioning by a positioning function of the communication terminal 500.

The display control unit 510 causes the information stored in the storage unit 502 to be displayed on a display unit 520 of the communication terminal 500. The display control unit 510 may cause the advertising content which is included in the distribution information stored in the storage unit 502 to be displayed on the display unit 520. The display control unit 510 may cause the distribution information stored in the storage unit 502 to be displayed on the display unit 520.

Figure 5:
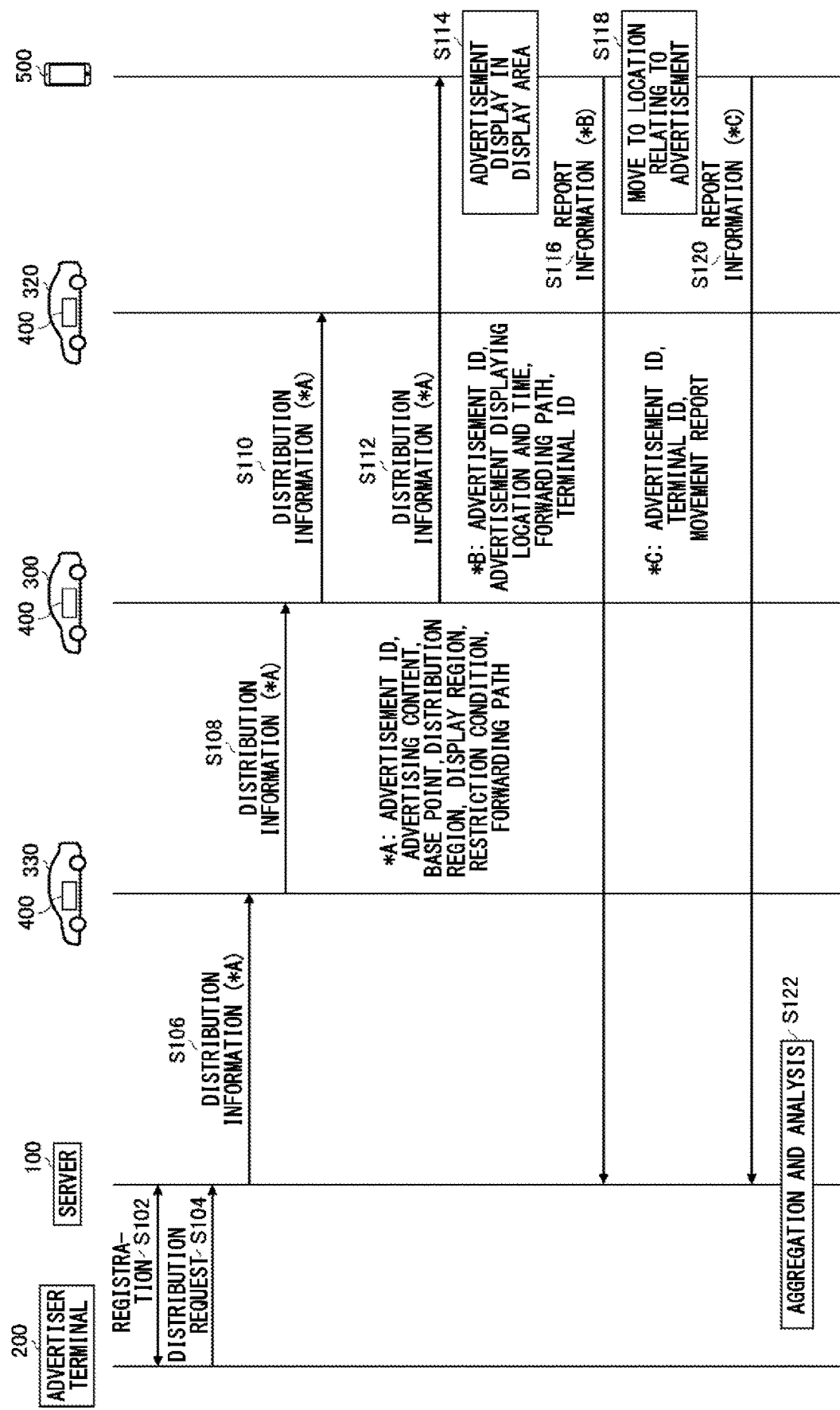
FIG. 5 schematically shows an example of a process flow in the system 10.

FIG. 5 schematically shows an example of a process flow in the system 10. FIG. 5 mainly describes a forwarding process of the distribution information.

The communication by the vehicle 300 is executed by the communication device 400 of the vehicle 300. The vehicle 300 may be an example of a first moving object. The communication by a vehicle 320 is executed by the communication device 400 of the vehicle 320. The vehicle 320 may be an example of a second moving object. The communication by a vehicle 330 is executed by the communication device 400 of the vehicle 330. The vehicle 330 may be an example of a third moving object.

In step 102 (the step may be abbreviated as S), the advertiser terminal 200 registers various types of information in the server 100. The advertiser terminal 200 may register the various types of information in the server 100 according to the instruction of the advertiser.

The advertiser terminal 200 registers the advertising content. The advertiser terminal 200 may register base point information which is the information of the advertising base point 202. The advertiser terminal 200 may register distribution region information indicating a geographic region (sometimes referred to as a distribution region) where the advertisement is distributed. The advertiser terminal 200 may register display region information indicating a geographic region (sometimes referred to as a display region) that causes the advertisement to be displayed on the display unit 520 of the communication terminal 500. The advertiser terminal 200 may register a restriction condition by which the transmission of the advertisement, and the forwarding to another device are restricted.

For each advertisement, the server 100 may generate the distribution information which includes advertisement identification information (sometimes referred to as an advertisement ID) that identifies the advertisement, and the various types of information registered by the advertiser terminal 200. The advertisement ID is, for example, a unique number specific to every advertisement.

In S104, the advertiser terminal 200 transmits the distribution request for the distribution information to the server 100. For example, the advertiser terminal 200 transmits, to the server 100, the distribution request for which the advertisement ID is specified.

In S106, the server 100 transmits, via the network 20 and the wireless base station 30, the distribution information to the vehicle 330 that is identified as a target for transmitting the distribution information. Further, in S106, the distribution information may be transmitted to the vehicle 330 from the advertiser terminal 200 rather than from the server 100. In this case, the communication between vehicle 330 and the advertiser terminal 200 may be in direct communication, or may be in indirect communication via the wireless base station 30. The cellular communication unit 404 of the vehicle 330 receives the distribution information transmitted by the server 100 or the advertiser terminal 200.

In the example shown in FIG. 5, the distribution information includes the advertisement ID, the advertising content, the base point information, the distribution region information, the display region information, the restriction condition, and forwarding path information. The forwarding path information is information which indicates a path along which the distribution information is forwarded. For example, moving object identification information of the vehicle 300 that has forwarded the distribution information is registered in the forwarding path information. The moving object identification information may be any information by which the vehicle 300 can be identified.

The communication device 400 of the vehicle 330 may refer to the distribution region information included in the received distribution information, and forward the distribution information when determining that a current location of the vehicle 330 is included in the distribution region. Here, the description will be continued assuming that the current location of the vehicle 330 is determined to be included.

In S108, the vehicle 330 adds the moving object identification information of the vehicle 330 to the forwarding path information which is included in the distribution information, and transmits the distribution information to the vehicle 300 via the vehicle-to-vehicle communication. The vehicle-to-vehicle communication unit 414 of the vehicle 300 receives the distribution information transmitted by the vehicle 330, and stores the distribution information in the storage unit 402. The distribution information management unit 416 may add the moving object identification information of the vehicle 300 to the forwarding path information of the received distribution information.

The distribution information management unit 416 of the vehicle 300 may manage a history of the advertisement identification information of the received distribution information, and when the vehicle-to-vehicle communication unit 414 receives distribution information and advertisement identification information of the distribution information is included in the history, may delete the distribution information. Note that the distribution information management unit 416 of the vehicle 330 may notify the vehicle 300 of the advertisement identification information of the received distribution information, and may transmit the distribution information to the vehicle 300 according to a response from the vehicle 300.

The control unit of the communication device 400 in the vehicle 300 determines whether the location which is indicated by the location information acquired by the location information acquisition unit 420 is included in the distribution region which is indicated by the distribution region information included in the distribution information. When the location is determined to be included, the vehicle-to-vehicle communication unit 414 determines that the distribution information can be transmitted to another vehicle. Further, when the location is determined to be included, the communication relay unit 408 determines that the distribution information can be transmitted to the communication terminal 500 which is relaying the communication.

In S110, the vehicle-to-vehicle communication unit 414 of the vehicle 300 transmits the distribution information to the vehicle 320 via the vehicle-to-vehicle communication. In S112, the communication relay unit 408 of the vehicle 300 transmits, via the terminal communication unit 406, the distribution information to the communication terminal 500 which is relaying the communication.

The Wi-Fi communication unit 506 of the communication terminal 500 stores the received distribution information in the storage unit 502. The display control unit 510 of the communication terminal 500 determines whether the communication terminal 500 is located in the display region which is indicated by the display region information included in the distribution information. The display control unit 510 may determine whether the location which is indicated by the location information acquired by the location information acquisition unit 508 is included in the display region.

In S114, the display control unit 510 causes the advertisement to be displayed on the display unit 520 in response to the determination that the communication terminal 500 is located in the display region. The display control unit 510 may cause the advertising content included in the distribution information to be displayed on the display unit 520. The display control unit 510 does not cause the advertisement included in the distribution information to be displayed on the display unit 520 while the communication terminal 500 is not located in the display region.

In S116, the cellular communication unit 504 transmits report information to the server 100 in response to the advertisement having been caused to be displayed on the display unit 520. The cellular communication unit 504 may transmit the report information to the server 100 via the wireless base station 30 and the network 20. The report information may include the advertisement ID, information on the location and time at which the advertisement is displayed, the forwarding path information, and the terminal identification information (sometimes referred to as a terminal ID) that identifies the communication terminal 500. The information of the location at which the advertisement is displayed may be the location information acquired by the location information acquisition unit 508 when the display unit 520 displays the advertisement.

In S118, the control unit of the communication terminal 500 determines whether the communication terminal 500 has moved to the location relating to the advertisement. For example, when the communication terminal 500 is located in the geographic region which is indicated by the advertising base point 202 of the base point information included in the distribution information, the control unit of the communication terminal 500 determines that the communication terminal 500 has moved to the location relating to the advertisement. Here, the description will be continued assuming that the communication terminal 500 is determined to have moved.

In S120, the cellular communication unit 504 transmits the report information to the server 100 in response to the determination that the communication terminal 500 has moved to the location relating to the advertisement. The cellular communication unit 504 may transmit the report information to the server 100 via the wireless base station 30 and the network 20. The report information may include the advertisement ID, the terminal ID of the communication terminal 500, and a movement report indicating that the communication terminal 500 has moved to the location relating to the advertisement.

In S122, the server 100 executes an aggregation, analysis, and the like of the received report information. The aggregation and analysis makes it possible to identify how the distribution information has been forwarded, the vehicle that has contributed to the forwarding of the distribution information, the number of times the distribution information has been displayed, the number of people who have viewed the distribution information, the number of people who have moved to the location relating to the advertisement by the distribution information, and the like. Note that FIG. 5 has described, as an example, the case where the server 100 receives the report that the communication terminal 500 has moved to the location relating to the advertisement; however, the present invention is not limited to this. When the Wi-Fi hotspot is arranged at the location relating to the advertisement, the Wi-Fi hotspot may notify the server 100 that the communication terminal 500 is connected to the Wi-Fi hotspot.

Figure 6:
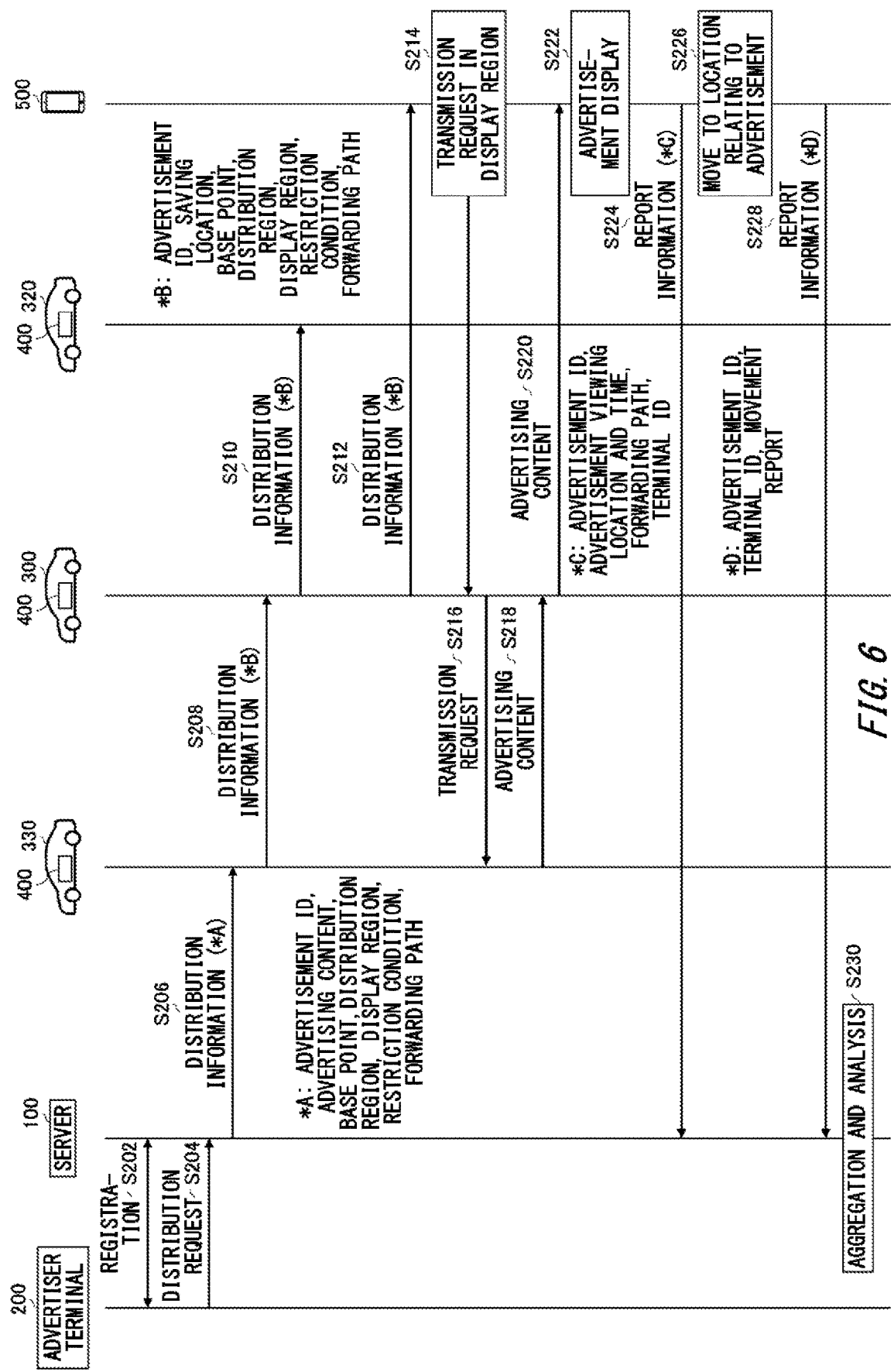
FIG. 6 schematically shows an example of a process flow in the system 10.

FIG. 6 schematically shows an example of a process flow in the system 10. FIG. 6 mainly describes a forwarding process of the distribution information. Here, differences from FIG. 5 will be mainly described.

In S202, the advertiser terminal 200 registers the various types of information in the server 100 according to the instruction of the advertiser. In S202, the advertiser terminal 200 transmits the distribution request for the distribution information to the server 100.

In S206, the server 100 transmits, via the network 20 and the wireless base station 30, the distribution information to the vehicle 330 that is identified as a target for transmitting the distribution information. In the example shown in FIG. 6, the distribution information includes the advertisement ID, the advertising content, the base point information, the distribution region information, the display region information, the restriction condition, and the forwarding path information. The cellular communication unit 404 of the vehicle 330 receives the distribution information transmitted by the server 100.

In S208, the vehicle 330 saves the advertising content included in the distribution information in the storage unit 402 of the vehicle 330, and replaces the advertising content included in the distribution information with saving location information which indicates a location where the advertising content is saved. The saving location information may be information by which the location where the advertising content is saved can be externally identified. For example, the saving location information includes the moving object identification information of the vehicle 330 and a saving place in the storage unit 402 of the vehicle 330. Then, the vehicle 330 transmits the distribution information to the vehicle 300 via the vehicle-to-vehicle communication.

The vehicle-to-vehicle communication unit 414 of the vehicle 300 receives the distribution information transmitted by the vehicle 330, and stores the distribution information in the storage unit 402. The distribution information management unit 416 may add the moving object identification information of the vehicle 300 to the forwarding path information of the distribution information. The control unit of the communication device 400 in the vehicle 300 determines whether the location which is indicated by the location information acquired by the location information acquisition unit 420 is included in the distribution region which is indicated by the distribution region information included in the distribution information. When the location is determined to be included, the vehicle-to-vehicle communication unit 414 determines that the distribution information can be transmitted to another vehicle. Further, when the location is determined to be included, the communication relay unit 408 determines that the distribution information can be transmitted to the communication terminal 500 which is relaying the communication.

In S210, the vehicle-to-vehicle communication unit 414 of the vehicle 300 transmits the distribution information to the vehicle 320 via the vehicle-to-vehicle communication. In S212, the communication relay unit 408 of the vehicle 300 transmits, via the terminal communication unit 406, the distribution information to the communication terminal 500 which is relaying the communication. Note that here, the case where the communication terminal 500 receives the distribution information from the communication relay unit 408 of the vehicle 300 is described; however, the communication terminal 500 may receive the distribution information from the communication relay unit 408 of the vehicle 320.

The Wi-Fi communication unit 506 of the communication terminal 500 stores the received distribution information in the storage unit 502. The control unit of the communication terminal 500 determines whether the communication terminal 500 is located in the display region which is indicated by the display region information included in the distribution information. The display control unit 510 may determine whether the location which is indicated by the location information acquired by the location information acquisition unit 508 is included in the display region.

In S214, the Wi-Fi communication unit 506 transmits a transmission request for the advertising content to the vehicle 300 in response to the determination that the communication terminal 500 is located in the display region. The communication relay unit 408 of the vehicle 300 receives the transmission request for the advertising content and stores the transmission request in the storage unit 402.

Note that here, the example in which the transmission request for the advertising content is transmitted to the vehicle 300 is described; however, the present invention is not limited to this. When the communication terminal 500 establishes a wireless communication connection with a vehicle other than the vehicle 300 at a timing of transmitting the transmission request for the advertising content, the Wi-Fi communication unit 506 may transmit the transmission request for the advertising content to the vehicle. Further, the cellular communication unit 504 may transmit, via the wireless base station 30 and the network 20, the transmission request for the advertising content to the vehicle 330 that has saved the advertising content.

In S216, the vehicle-to-vehicle communication unit 414 of the vehicle 300 transmits the transmission request for the advertising content to the vehicle 330. The vehicle-to-vehicle communication unit 414 of the vehicle 300 may transmit the transmission request for the advertising content to the vehicle 330 via another vehicle. For example, the vehicle-to-vehicle communication unit 414 of the vehicle 300 directly transmits the transmission request for the advertising content to the vehicle 330 when the vehicle 330 is located within a range of the vehicle-to-vehicle communication, and transmits, via a vehicle other than the vehicle 330, the transmission request for the advertising content to the vehicle 330 when the vehicle 330 is not located within the range of the vehicle-to-vehicle communication. In this way, a forwarding path of the transmission request for the advertising content may or may not depend on the forwarding path of the distribution information. In S218, the vehicle-to-vehicle communication unit 414 of the vehicle 330 transmits the advertising content stored in the storage unit 402 to the vehicle 300 in response to the transmission request for the advertising content received in S216. The vehicle-to-vehicle communication unit 414 of the vehicle 330 may transmit the advertising content to the vehicle 300 via another vehicle. For example, the vehicle-to-vehicle communication unit 414 of the vehicle 330 directly transmits the advertising content to the vehicle 300 when the vehicle 300 is located within a range of the vehicle-to-vehicle communication, and transmits, via a vehicle other than the vehicle 300, the advertising content to the vehicle 300 when the vehicle 300 is not located within the range of the vehicle-to-vehicle communication. In this way, a forwarding path of the advertising content may or may not depend on the forwarding path of the distribution information and the forwarding path of the transmission request for the advertising content. The vehicle-to-vehicle communication unit 414 of the vehicle 300 stores the received advertising content in the storage unit 402. In S220, the communication relay unit 408 of the vehicle 300 transmits, to the communication terminal 500, the advertising content stored in the storage unit 402 in S218 as a response to the transmission request for the advertising content received from the communication terminal 500 in S214. The Wi-Fi communication unit 506 of the communication terminal 500 stores the received advertising content in the storage unit 502. In S222, the display control unit 510 of the communication terminal 500 causes the advertising content received in S220 to be displayed on the display unit 520.

In S224, the cellular communication unit 504 transmits the report information to the server 100 in response to the advertising content being caused to be displayed on the display unit 520. In S226, the control unit of the communication terminal 500 determines whether the communication terminal 500 has moved to the location relating to the advertisement. In S228, the cellular communication unit 504 transmits the report information to the server 100 in response to the determination that the communication terminal 500 has moved to the location relating to the advertisement. In S230, the server 100 executes an aggregation, analysis, and the like of the received report information.

As shown in FIG. 6, by forwarding the saving location information indicating the saving location of the advertising content, instead of the advertising content, it is possible to reduce the communication volume when the distribution information is forwarded. Therefore, the distribution information can be forwarded with high reliability even in a communication with a limited communication time, for example, the vehicle-to-vehicle communication.

In S206, as a target for transmitting the distribution information including the advertising content, the server 100 may identify a vehicle that is unlikely to move. The server 100 identifies, for example, a parked vehicle as a target for transmitting the distribution information. Further, the server 100 identifies, for example, a stopped vehicle as a target for transmitting the distribution information. This makes it possible to reduce a possibility that the vehicle which has saved the advertising content moves out of the distribution region and an acquirer of the advertising content does not exist in the distribution region.

Further, in S206, as a target for transmitting the distribution information including the advertising content, the server 100 may identify a vehicle having a slower moving speed. For example, the server 100 periodically collects moving speeds of a plurality of vehicles to identify a vehicle having a slower moving speed from among the plurality of vehicles.

Note that in S206 in FIG. 6, the case where the server 100 transmits the distribution information including the advertising content to the vehicle 330 is described as an example; however, the present invention is not limited to this. The server 100 may save the advertising content in itself without forwarding the content to the vehicle. For example, in S206, the server 100 transmits the distribution information including the saving location information to the vehicle 330 rather than the advertising content. In this case, the communication terminal 500 may transmit the transmission request for the advertising content to the server 100 via the wireless base station 30 and the network 20 by the cellular communication, instead of forwarding the transmission request for the advertising content by the vehicle-to-vehicle communication.

Figure 7:
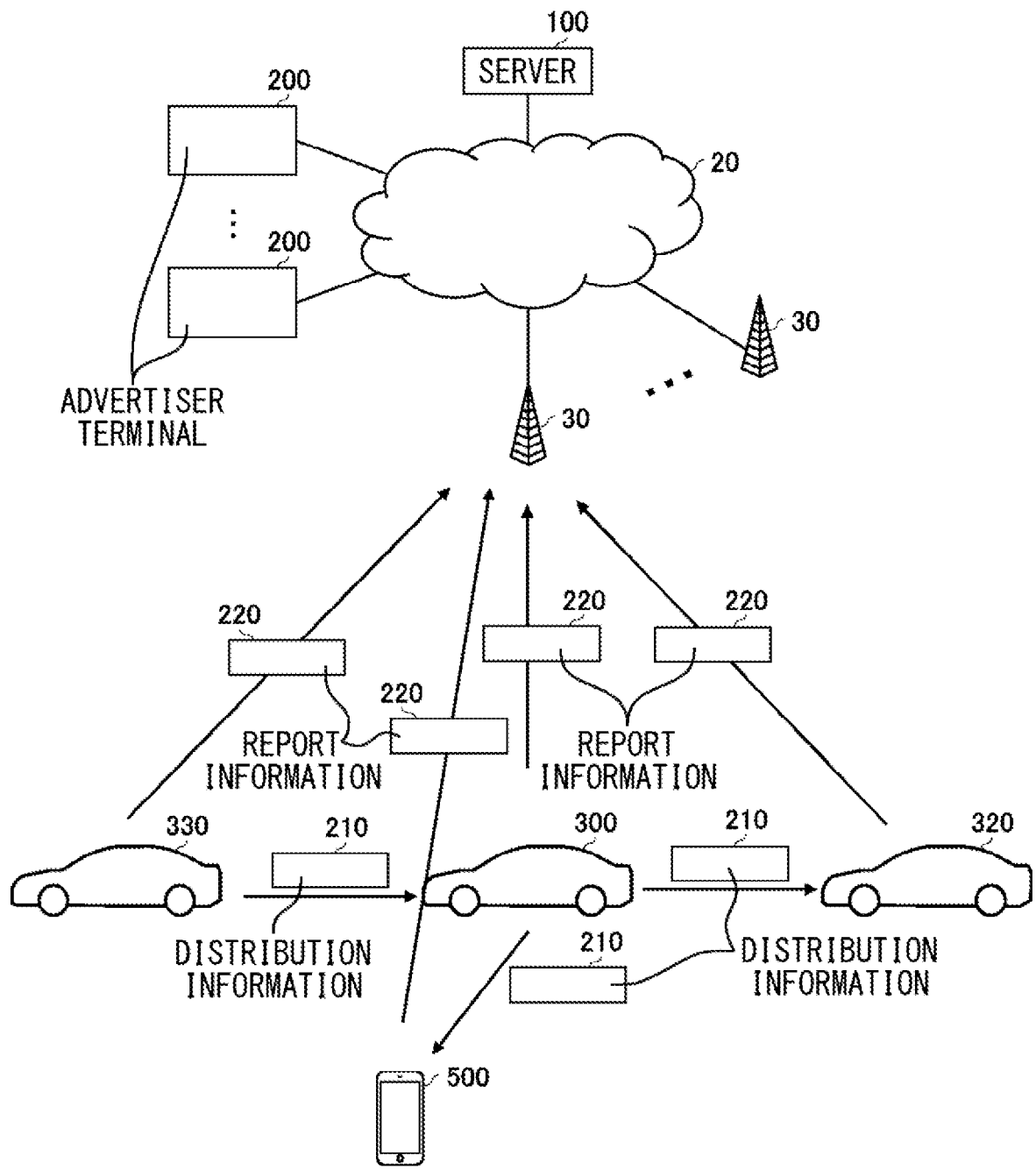
FIG. 7 schematically shows a report process flow in the system 10.

FIG. 7 schematically shows a report process flow in the system 10. In the example shown in FIG. 7, the communication device 400 and the communication terminal 500 transmit report information 220 to the server 100 by using the cellular communication. In the example shown in FIG. 7, the vehicle 330 receives distribution information 210 from the server 100, the advertiser terminal 200, or another vehicle to forward the distribution information 210 to the vehicle 300, and the vehicle 300 forwards the distribution information 210 to the vehicle 320 and the communication terminal 500, respectively.

For example, the cellular communication unit 404 of the vehicle 330 transmits, to the server 100 via the wireless base station 30 and the network 20, the report information 220 which reports that the distribution information 210 has been received. The cellular communication unit 404 of the vehicle 330 may transmit, to the server 100, the report information 220 which includes the advertisement ID included in the distribution information 210 and the moving object identification information of the vehicle 330.

Further, for example, the cellular communication unit 404 of the vehicle 300 transmits, to the server 100 via the wireless base station 30 and the network 20, the report information 220 which reports that the vehicle-to-vehicle communication unit 414 has received the distribution information 210 from the vehicle 330. The cellular communication unit 404 may transmit, to the server 100, the report information 220 which includes the advertisement ID included in the distribution information 210 and the moving object identification information of the vehicle 300.

The cellular communication unit 404 may include, in the report information 220, the moving object identification information of the vehicle 330 as a transmission source of the distribution information 210 received by the vehicle-to-vehicle communication unit 414. Further, when the vehicle-to-vehicle communication unit 414 transmits the distribution information 210 to the vehicle 320, the cellular communication unit 404 may include, in the report information 220, the moving object identification information of the vehicle 320 as a transmission destination of the distribution information 210.

The cellular communication unit 404 may include, in the report information 220, the location information of the vehicle 300 at the time when the vehicle-to-vehicle communication unit 414 receives the distribution information 210, the location information being acquired by the location information acquisition unit 420. The cellular communication unit 404 may include, in the report information 220, the location information of the vehicle 300 at the time when the vehicle-to-vehicle communication unit 414 transmits the distribution information 210 to the vehicle 320, the location information being acquired by the location information acquisition unit 420. The cellular communication unit 404 may include, in the report information 220, time information on a time when the vehicle-to-vehicle communication unit 414 receives the distribution information 210.

The cellular communication unit 404 of the vehicle 330 may transmit, to the server 100 via the wireless base station 30 and the network 20, the report information 220 which reports that the distribution information 210 has been transmitted to the vehicle 300. The cellular communication unit 404 of the vehicle 300 may transmit, to the server 100 via the wireless base station 30 and the network 20, the report information 220 which reports that the vehicle-to-vehicle communication unit 414 has transmitted the distribution information 210 to the vehicle 320.

The cellular communication unit 504 of the communication terminal 500 may transmit, to the server 100 via the wireless base station 30 and the network 20, the report information 220 which reports that the Wi-Fi communication unit 506 has received the distribution information 210 from the vehicle 300. The cellular communication unit 504 may transmit, to the server 100, the report information 220 which includes the advertisement ID included in the distribution information 210 and the terminal identification information of the communication terminal 500. Further, the communication terminal 500 may transmit the report information 220 to the wireless base station 30 via the vehicle 300 by using the Wi-Fi communication unit 506.

After the advertising content included in the received distribution information is displayed on the display unit 520, in a case where the communication terminal 500 is located in the geographic region which is indicated by advertisement-related location information included in the distribution information 210, the cellular communication unit 504 may transmit, to the server 100, the report information 220 which includes the advertisement ID, the terminal identification information of the communication terminal 500, and information indicating that the communication terminal 500 has moved to an advertisement-related location.

As shown in FIG. 7, the vehicle 300 and the communication terminal 500 are configured to transmit the report information 220 to the server 100 by using the cellular communication, and thus there is a possibility that cellular communication costs will be incurred; however, a reliable and high real-time aggregation and analysis can be achieved.

Figure 8:
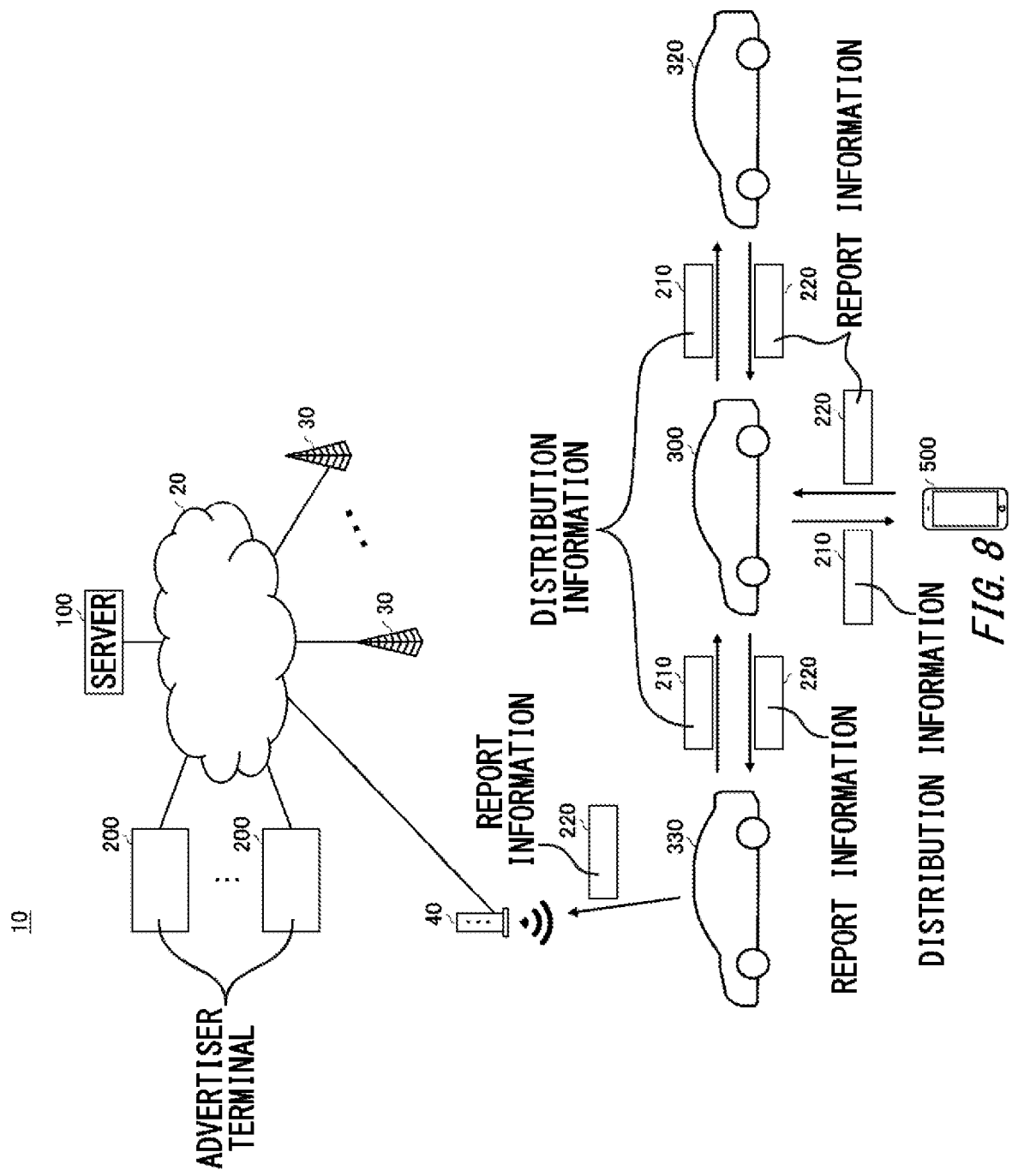
FIG. 8 schematically shows a report process flow in the system 10.

FIG. 8 schematically shows a report process flow in the system 10. Here, differences from FIG. 7 will be mainly described. FIG. 8 describes a case where a vehicle that can use, by the report information 220 being forwarded between the vehicles, a low cost communication system which has a lower communication cost than that of the cellular communication system, uses the low cost communication system, and collectively transmits the report information 220 to server 100. In the example shown in FIG. 8, the Wi-Fi communication system via an access point 40 is illustrated as a low cost communication system. The access point 40 is, for example, a so-called free Wi-Fi hotspot or a roadside unit.

In the example shown in FIG. 8, the distribution information 210 is forwarded from the vehicle 330 to the vehicle 300, and is forwarded from the vehicle 300 to the vehicle 320 and the communication terminal 500, respectively. Then, the vehicle 320 transmits, to the vehicle 300, the report information 220 which reports that the distribution information 210 has been received from the vehicle 300, and the communication terminal 500 transmits, to the vehicle 300, the report information 220 which reports that the distribution information 210 has been received from the vehicle 300. The communication terminal 500 may transmit, to the vehicle 300, the report information 220 which reports that the communication terminal 500 has moved to the location relating to the advertisement.

The vehicle-to-vehicle communication unit 414 of the vehicle 300 stores the report information 220 received from the vehicle 320 in the storage unit 402. Further, the communication relay unit 408 of the vehicle 300 stores the report information 220 received from the communication terminal 500 in the storage unit 402. Then, the vehicle-to-vehicle communication unit 414 of the vehicle 300 transmits, to the vehicle 330, the report information 220 which reports that the distribution information 210 has been received from the vehicle 330, and the report information 220 received from the vehicle 320 and the report information 220 received from the communication terminal 500, the two pieces of report information 220 being stored in the storage unit 402. The vehicle-to-vehicle communication unit 414 may be an example of a storage information transmission unit.

The vehicle-to-vehicle communication unit 414 of the vehicle 330 stores the report information 220 received from the vehicle 300 in the storage unit 402. The AP communication unit 412 of the vehicle 330 transmits the report information 220 stored in the storage unit 402 to the server 100 via the access point 40 and the network 20 in response to the establishment of the wireless communication connection with the access point 40, and deletes the report information 220 from the storage unit 402.

When the AP communication unit 412 of the vehicle 300 establishes the wireless communication connection with the access point 40, the AP communication unit 412 of the vehicle 300 may transmit the report information 220 stored in the storage unit 402 to the server 100 via the access point 40 and the network 20 in response to the establishment of the wireless communication connection with the access point 40, and may delete the report information 220 from the storage unit 402. The AP communication unit 412 may be an example of a storage information transmission unit.

As shown in FIG. 8, the vehicle that can use the low cost communication system by the report information 220 being forwarded between the vehicles, is configured to collectively transmit the report information 220 to server 100 so that it is possible to reduce the communication cost in comparison with a case where the vehicle 300 and the communication terminal 500 transmit the report information 220 to the server 100 by using the cellular communication system.

In the example shown in FIG. 8, the report information 220 may include a stop condition by which the forwarding of the report information 220 is stopped. The stop condition indicates, for example, a stop time. In this case, when the stop time indicated by the stop condition of the report information 220 has passed, the vehicle that has received the report information 220 may delete the report information 220 without forwarding the report information 220 to another vehicle.

Further, the stop condition may indicate the number of stop-hops. In this case, in the report information 220, the hop count for forwarding may be recorded. When the hop count recorded in the report information 220 is equal to the hop count for forwarding indicated by the stop condition of the report information 220, the vehicle that has received the report information 220 may delete the report information 220 without forwarding the report information 220 to another vehicle. This enables prevention of an increase in communication traffic within the vehicle network.

Note that FIG. 8 has described, as an example, the case where the report information 220 is forwarded by the same forwarding path as the forwarding path of the distribution information 210; however, the present invention is not limited to this. The forwarding path of the report information 220 may be different from the forwarding path of the distribution information 210.

Figure 9:
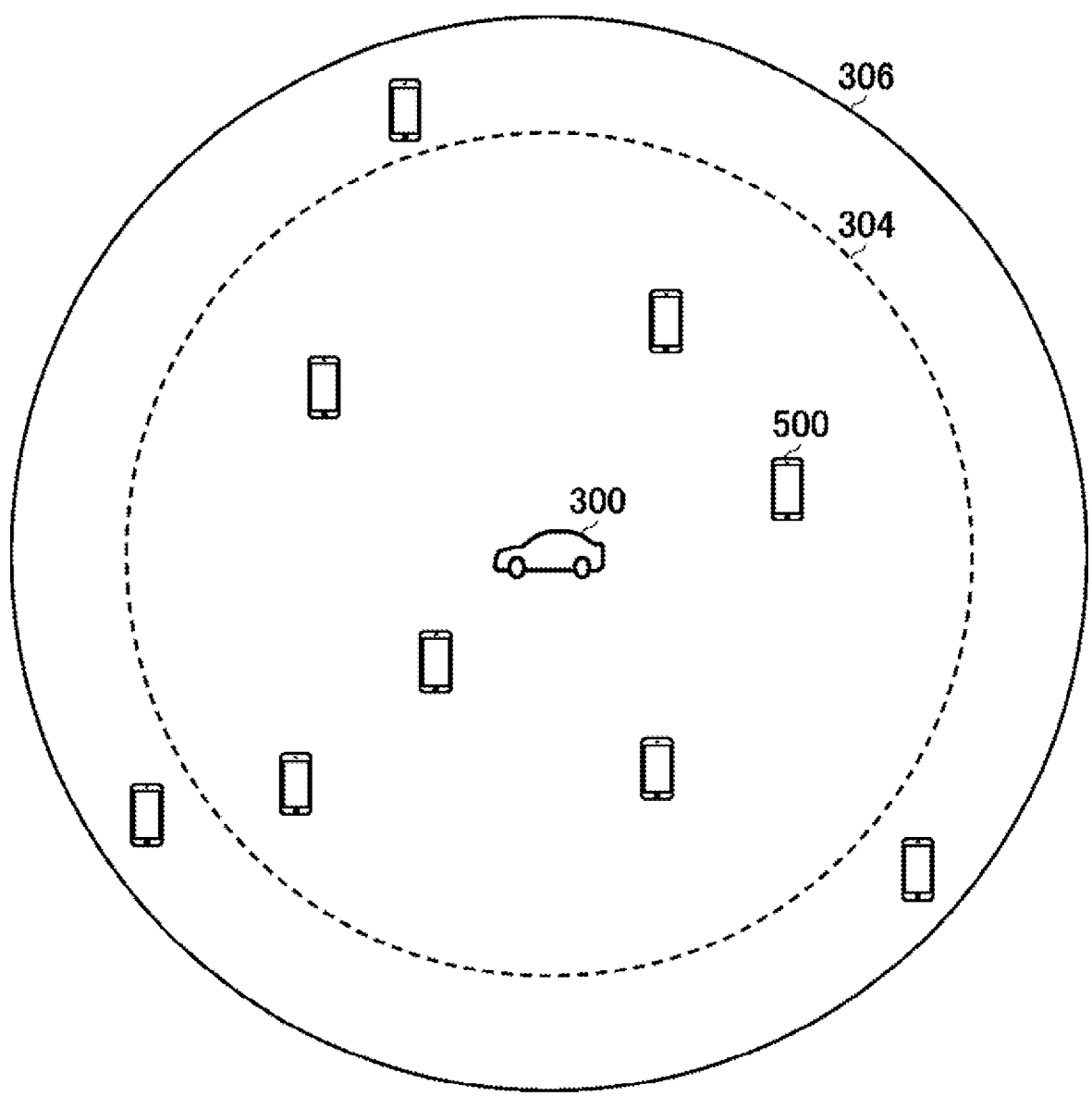
FIG. 9 is an illustration for describing a control process of communication settings by a communication control unit 410.

FIG. 9 is an illustration for describing a control process of communication settings by a communication control unit 410. FIG. 9 illustrates a case where the communication control unit 410 controls the size of the wireless communication area where the terminal communication unit 406 wirelessly communicates with the communication terminal 500.

The communication control unit 410 may control the size of the wireless communication area based on the advertisement-related location information which indicates the location relating to the advertisement, and moving object location information on the current location of the vehicle 300 which is acquired by the location information acquisition unit 420, the advertisement-related location information and the moving object location information being included in the distribution information stored in the storage unit 402 of the vehicle 300.

The communication control unit 410 controls the communication settings, for example, when the location indicated by the moving object location information changes from a state of not corresponding to the location indicated by the advertisement-related location information to a state of corresponding thereto. In FIG. 9, a wireless communication area 304 shows a wireless communication area in a state in which the location indicated by the moving object location information does not correspond to the location indicated by the advertisement-related location information, and a wireless communication area 306 shows a wireless communication area in a state of the location corresponding. In this way, in comparison with the case where the location indicated by the moving object location information does not correspond to the location indicated by the advertisement-related location information, in the case of the location corresponding, the communication control unit 410 may control the communication settings to increase the size of the wireless communication area.

In a case where the advertisement-related location information indicates a location of an issuing source of the advertisement, when a distance between the location indicated by the moving object location information, and the location of the issuing source of the advertisement changes from a state of being longer than a predetermined threshold to a state of being shorter than the predetermined threshold, the communication control unit 410 may control the communication settings. In FIG. 9, the wireless communication area 304 shows the wireless communication area in the state in which the distance between the location indicated by the moving object location information and the location of the issuing source of the advertisement is longer than the predetermined threshold, and the wireless communication area 306 shows the wireless communication area in the state in which the distance is shorter than the threshold. In this way, in comparison with the case where the distance between the location indicated by the moving object location information and the location of the issuing source of the advertisement is longer than the predetermined threshold, in the case of the distance being shorter than the predetermined threshold, the communication control unit 410 may control the communication settings to increase the size of the wireless communication area.

In a case where the advertisement-related location information indicates the geographic region relating to the advertisement, when the location indicated by the moving object location information changes from a state of not being included in the geographic region relating to the advertisement to a state of being included in the geographic region, the communication control unit 410 may control the communication settings. The advertisement-related location information may indicate the distribution region for distributing the advertisement. Further, the advertisement-related location information may indicate the display region for displaying the advertisement. In FIG. 9, the wireless communication area 304 shows the wireless communication area in the state in which the location indicated by the moving object location information is not included in the geographic region relating to the advertisement, and the wireless communication area 306 shows the wireless communication area in the state in which the location is included in the geographic region. In this way, in comparison with the case where the location indicated by the moving object location information is not included in the geographic region relating to the advertisement, in the case of the location being included in the geographic region, the communication control unit 410 may control the communication settings to increase the size of the wireless communication area.

This enables a relative increase in size of the wireless communication area to transmit the distribution information to more communication terminals 500 when the vehicle 300 is located near the issuing source of the advertisement. Further, when the vehicle 300 is not located near the issuing source of the advertisement, the power consumption of the vehicle 300 can be reduced by relatively decreasing the size of the wireless communication area.

The expression that the vehicle 300 is located near the issuing source of the advertisement means that the communication terminal 500 that has established the wireless communication connection with the vehicle 300 is also located comparatively near the issuing source of the advertisement. Accordingly, by transmitting the distribution information to the communication terminal 500, a possibility that the owner of the communication terminal 500 moves to the issuing source of the advertisement becomes higher in comparison with the case where the vehicle 300 is not located near the issuing source of the advertisement. Therefore, by relatively increasing the size of the wireless communication area in the case where the vehicle 300 is located near the issuing source of the advertisement, it is possible to increase the number of advertisement distributions when an effect of the advertisement is large, and to reduce the power consumption when the effect of the advertisement is smaller.

The communication control unit 410 may control the communication settings for communicating with the communication terminal 500 based on the speed information of the vehicle 300 acquired by the speed information acquisition unit 422. For example, the communication control unit 410 controls the communication settings such that the faster the moving speed of the vehicle 300, the smaller the size of the wireless communication area for wireless communicating with the communication terminal 500. This enables a reduction in the number of the communication terminals 500 that are targets for transmitting the distribution information when the moving speed of the vehicle 300 is comparatively fast and the wireless communication with the communication terminal 500 is unlikely to be stably executed.

The communication control unit 410 may control the communication settings such that the faster the moving speed of the vehicle 300, the larger the size of the wireless communication area for wireless communicating with the communication terminal 500. This makes it possible to lengthen a time until the communication terminal 500 leaves the wireless communication area, and to enhance the possibility that the distribution information can be transmitted to the communication terminal 500 when the moving speed of the vehicle 300 is comparatively fast.

The communication control unit 410 may control the communication settings for communicating with the communication terminal 500 based on the number of pieces of the distribution information stored in the storage unit 402.

For example, the communication control unit 410 controls the communication settings such that the larger the number of pieces of the distribution information stored in the storage unit 402, the larger the size of the wireless communication area where the terminal communication unit 406 wirelessly communicates with the communication terminal 500.

FIG. 9 has described the case where the communication control unit 410 controls the size of the wireless communication area where the terminal communication unit 406 wirelessly communicates with the communication terminal 500; however, the present invention is not limited to this. The communication control unit 410 may control, as one of the communication settings, the number of allowable connections by which the communication relay unit 408 establishes the wireless communication connection with the communication terminal 500.

The communication control unit 410 may change the number of the allowable connections based on the advertisement-related location information which indicates the location relating to the advertisement, and the moving object location information on the current location of the vehicle 300 which is acquired by the location information acquisition unit 420, the advertisement-related location information and the moving object location information being included in the distribution information stored in the storage unit 402 of the vehicle 300. The communication control unit 410 changes the number of the allowable connections, for example, when the location indicated by the moving object location information changes from a state of not corresponding to the location indicated by the advertisement-related location information to a state of corresponding thereto.

In the case where the advertisement-related location information indicates the location of the issuing source of the advertisement, when a distance between the location indicated by the moving object location information, and the location of the issuing source of the advertisement changes from a state of being longer than a predetermined threshold to a state of being shorter than the predetermined threshold, the communication control unit 410 may change the number of the allowable connections. For example, in comparison with the case where the distance between the location indicated by the moving object location information and the location of the issuing source of the advertisement is longer than the predetermined threshold, in the case of the distance being shorter than the predetermined threshold, the communication control unit 410 increases the number of the allowable connections.

In the case where the advertisement-related location information indicates the geographic region relating to the advertisement, when the location indicated by the moving object location information changes from a state of not being included in the geographic region relating to the advertisement to a state of being included in the geographic region, the communication control unit 410 may change the number of the allowable connections. For example, in comparison with the case where the location indicated by the moving object location information is not included in the geographic region relating to the advertisement, in the case of the location being included in the geographic region, the communication control unit 410 increases the number of the allowable connections.

This enables a relative increase in the number of the allowable connections to transmit the distribution information to more communication terminals 500 when the vehicle 300 is located near the issuing source of the advertisement. Further, when the vehicle 300 is not located near the issuing source of the advertisement, the power consumption of the vehicle 300 can be reduced by relatively decreasing the number of the allowable connections.

The communication control unit 410 may control, as one of the communication settings, the allowable connection time during which the communication relay unit 408 establishes the wireless communication connection with the communication terminal 500. The communication control unit 410 may change the allowable connection time based on the advertisement-related location information which indicates the location relating to the advertisement, and the moving object location information on the current location of the vehicle 300 which is acquired by the location information acquisition unit 420, the advertisement-related location information and the moving object location information being included in the distribution information stored in the storage unit 402 of the vehicle 300. The communication control unit 410 changes the allowable connection time, for example, when the location indicated by the moving object location information changes from a state of not corresponding to the location indicated by the advertisement-related location information to a state of corresponding thereto.

In the case where the advertisement-related location information indicates the location of the issuing source of the advertisement, when a distance between the location indicated by the moving object location information, and the location of the issuing source of the advertisement changes from a state of being longer than a predetermined threshold to a state of being shorter than the predetermined threshold, the communication control unit 410 may change the allowable connection time. For example, in comparison with the case where the distance between the location indicated by the moving object location information and the location of the issuing source of the advertisement is longer than the predetermined threshold, in the case of the distance being shorter than the predetermined threshold, the communication control unit 410 decreases the allowable connection time.

In the case where the advertisement-related location information indicates the geographic region relating to the advertisement, when the location indicated by the moving object location information changes from a state of not being included in the geographic region relating to the advertisement to a state of being included in the geographic region, the communication control unit 410 may change the allowable connection time. For example, in comparison with the case where the location indicated by the moving object location information is not included in the geographic region relating to the advertisement, in the case of the location being included in the geographic region, the communication control unit 410 decreases the allowable connection time.

This enables a relative decrease in allowable connection time to transmit the distribution information to more communication terminals 500 when the vehicle 300 is located near the issuing source of the advertisement.

The communication control unit 410 may control the on/off of the relay function of the communication relay unit 408 as one of the communication settings. The communication control unit 410 may control the on/off of the communication relay unit 408 based on the advertisement-related location information which indicates the location relating to the advertisement, and the moving object location information on the current location of the vehicle 300 which is acquired by the location information acquisition unit 420, the advertisement-related location information and the moving object location information being included in the distribution information stored in the storage unit 402 of the vehicle 300. The communication control unit 410 controls the on/off of the relay function of the communication relay unit 408, for example, when the location indicated by the moving object location information changes from a state of not corresponding to the location indicated by the advertisement-related location information to a state of corresponding thereto.

In the case where the advertisement-related location information indicates the location of the issuing source of the advertisement, the communication control unit 410 turns off the relay function in a state in which a distance between the location indicated by the moving object location information, and the location of the issuing source of the advertisement is longer than a predetermined threshold, and turns on the relay function when the distance changes to be in a short state. In the case where the advertisement-related location information indicates the geographic region relating to the advertisement, the communication control unit 410 turns off the relay function in a state in which the location indicated by the moving object location information is in a state of not being included in the geographic region relating to the advertisement, and turns on the relay function when the location changes to be in a state of being included in the geographic region.

This enables the relay function to be turned on so as to distribute the distribution information only when the vehicle 300 is located near the issuing source of the advertisement.

Note that the communication control unit 410 may control the communication settings for the vehicle-to-vehicle communication unit 414 to communicate with another vehicle. For example, the communication control unit 410 controls, based on the advertisement-related location information and the moving object location information, the communication settings for the vehicle-to-vehicle communication unit 414 to communicate with another vehicle.

When determining that the location indicated by the moving object location information corresponds to the location indicated by the advertisement-related location information, in comparison with a case of determining that the location does not correspond thereto, the communication control unit 410 may widen a communication range where the vehicle-to-vehicle communication unit 414 wirelessly communicates with another vehicle. For example, in the case where the advertisement-related location information indicates the location of the issuing source of the advertisement, when a distance between the location indicated by the moving object location information, and the location of the issuing source of the advertisement is shorter than a predetermined threshold, in comparison with when the distance is longer, the communication control unit 410 widens the communication range, where the vehicle-to-vehicle communication unit 414 wirelessly communicates with another vehicle. Further, for example, in the case where the advertisement-related location information indicates the geographic region relating to the advertisement, when the location indicated by the moving object location information is included in the geographic region relating to the advertisement, in comparison with when the location is not included in the geographic region, the communication control unit 410 widens the communication range, where the vehicle-to-vehicle communication unit 414 wirelessly communicates with another vehicle. This makes it possible to widen the communication range of the vehicle-to-vehicle communication of the vehicle 300 to forward the distribution information to more other vehicles 300 when the vehicle 300 is located near the issuing source of the advertisement.

Figure 10:
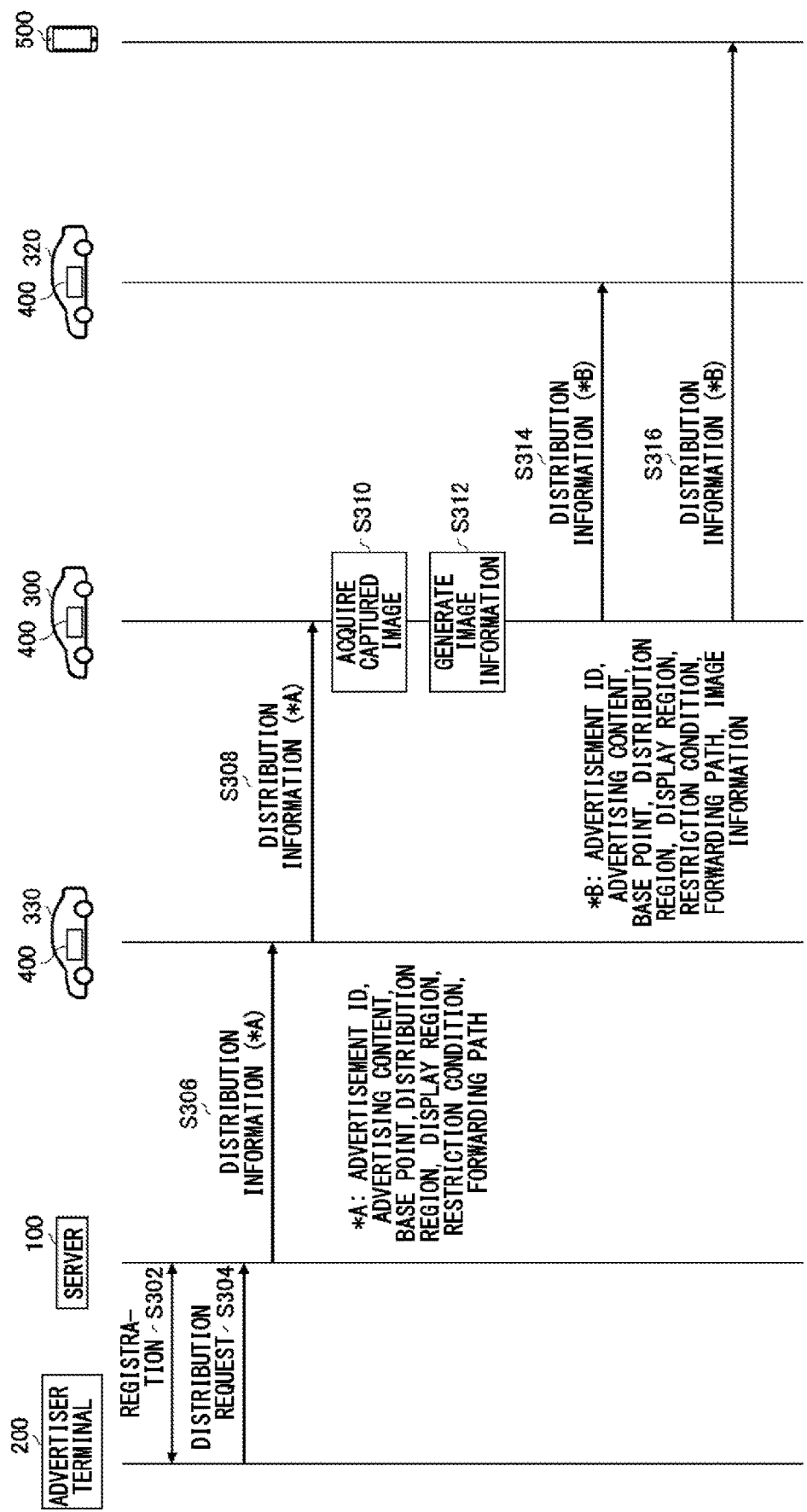
FIG. 10 schematically shows an example of a process flow in the system 10.

FIG. 10 schematically shows an example of a process flow in the system 10. FIG. 10 mainly describes a forwarding process of the distribution information. Here, differences from FIG. 5 will be mainly described.

In S302, the advertiser terminal 200 registers the various types of information in the server 100. In S304, the advertiser terminal 200 transmits the distribution request for the distribution information to the server 100.

In S306, the server 100 transmits, via the network 20 and the wireless base station 30, the distribution information to the vehicle 330 that is identified as a target for transmitting the distribution information. The cellular communication unit 404 of the vehicle 330 receives the distribution information transmitted by the server 100. In the example shown in FIG. 10, the distribution information includes the advertisement ID, the advertising content, the base point information, the distribution region information, the display region information, the restriction condition, and the forwarding path information.

In S308, the vehicle 330 adds the moving object identification information of the vehicle 330 to the forwarding path information which is included in the distribution information, and transmits the distribution information to the vehicle 300 via the vehicle-to-vehicle communication. The vehicle-to-vehicle communication unit 414 of the vehicle 300 receives the distribution information transmitted by the vehicle 330, and stores the distribution information in the storage unit 402.

In S310, the captured image acquisition unit 430 acquires the captured image obtained by the image capturing unit 310 of the vehicle 300 capturing the location relating to the advertisement which is indicated by the base point information included in the distribution information. In S312, the image information generation unit 432 generates the image information.

The image information generation unit 432 generates, for example, the image information which includes the captured image acquired by the captured image acquisition unit 430 in S310. The image information generation unit 432 may generate the image information which includes image-related information relating to the captured image acquired by the captured image acquisition unit 430 in S310. The image-related information may include the saving location information which indicates the location where the captured image is saved. The image-related information may include an analysis result obtained by analyzing the captured image. The image-related information may include, as an analysis result obtained by analyzing the image, included in the captured image, of the location relating to the advertisement, situation information which indicates a situation of the location relating to the advertisement. The image information generation unit 432 generates, for example, the situation information by analyzing the captured image. As a specific example, when the location relating to the advertisement is a store, the image information generation unit 432 generates the situation information which indicates the situation of the store by analyzing a part of the store in the captured image. The situation information indicates, for example, how crowded the store is, how long a queue is at the store, and the like. The image information generation unit 432 stores the generated image information in the storage unit 402.

In S314, the vehicle-to-vehicle communication unit 414 of the vehicle 300 transmits, to the vehicle 320, the distribution information and the image information, the distribution information being obtained by the distribution information management unit 416 adding the moving object identification information of the vehicle 300 to the forwarding path information. For example, the vehicle-to-vehicle communication unit 414 may transmit, to the vehicle 320, the distribution information edited to include the image information by the distribution information management unit 416. The vehicle-to-vehicle communication unit 414 may separately transmit the distribution information and the image information to the vehicle 320.

In S316, the communication relay unit 408 of the vehicle 300 transmits, to the communication terminal 500, the distribution information and the image information, the distribution information being obtained by the distribution information management unit 416 adding the moving object identification information of the vehicle 300 to the forwarding path information. For example, the communication relay unit 408 may transmit, to the communication terminal 500, the distribution information edited to include the image information by the distribution information management unit 416. The communication relay unit 408 may separately transmit the distribution information and the image information to the communication terminal 500.

As shown in FIG. 10, by forwarding the image information which includes at least any of the captured image obtained by capturing the location relating to the advertisement and the image-related information, together with the distribution information, it is possible to make a viewer of the distribution information grasp the situation of the location relating to the advertisement.

Note that FIG. 10 has described the case where the image information is forwarded by the vehicle-to-vehicle communication; however, the present invention is not limited to this, and the image information may be transmitted to the server 100. For example, the vehicle 300 transmits the advertisement ID and the image information to the server 100 by using the cellular communication. The server 100 stores the image information in association with the advertisement ID. Then, for example, the communication terminal 500 acquires the image information corresponding to the advertisement ID from the server 100 by transmitting the advertisement ID to the server 100 by the cellular communication.

Figure 11:
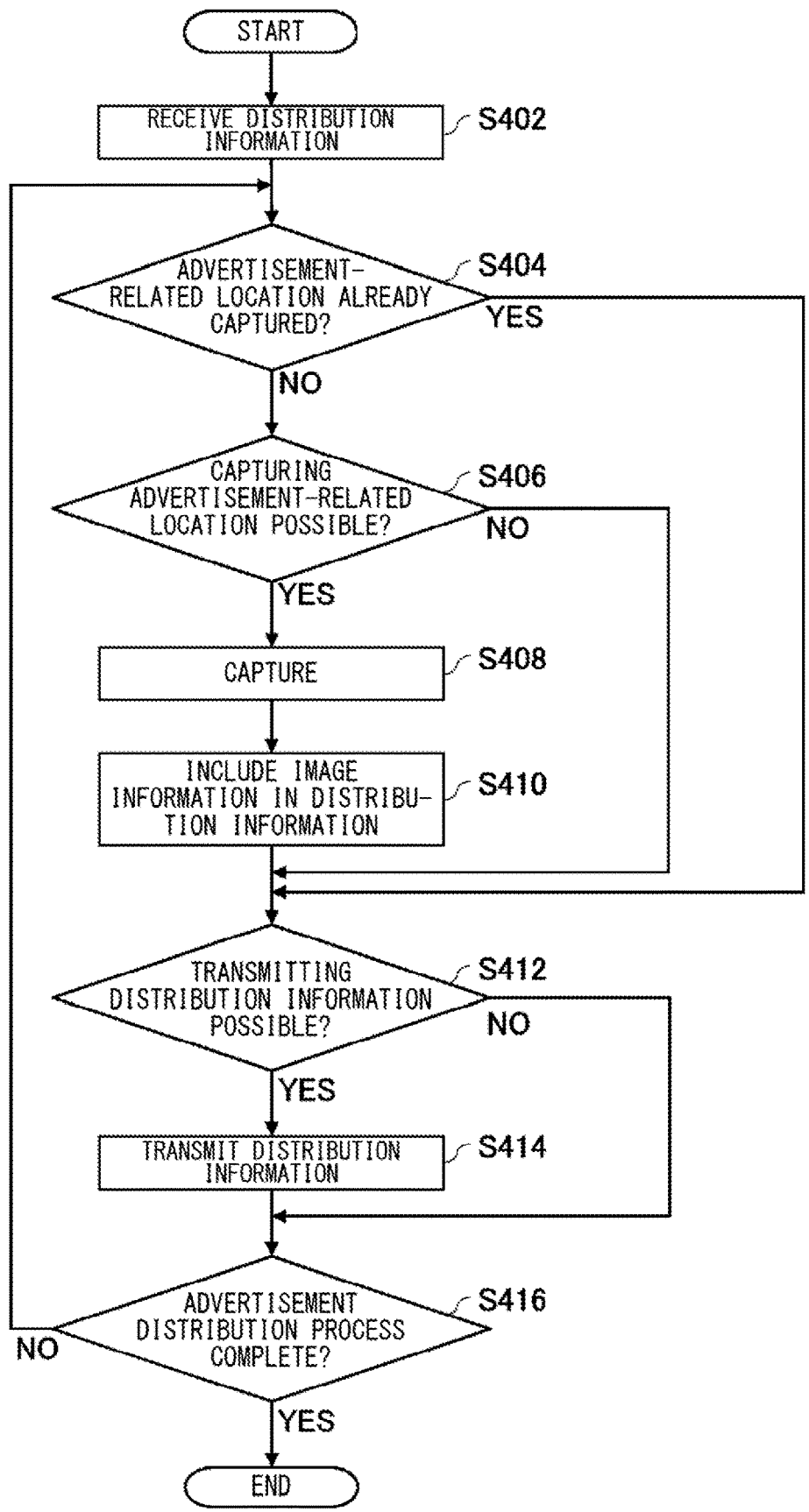
FIG. 11 shows an example of a process flow by the communication device 400.

FIG. 11 shows an example of a process flow by the communication device 400. FIG. 11 describes a flow of transmitting outside, the image information which includes at least any of the captured image obtained by capturing the location relating to the advertisement and the image-related information relating to the captured image, and the distribution information. Here, a case where the captured image acquisition unit 430 instructs the image capturing unit 310 to capture the image based on the moving object location information and the advertisement-related location information of the vehicle 300, and acquires the captured image which is captured by the image capturing unit 310 will be described.

In S402, the cellular communication unit 404 or the vehicle-to-vehicle communication unit 414 receives the distribution information. If the advertisement-related location which is indicated by the base point information included in the distribution information has not yet been captured (NO in S404), the process proceeds to S406, and if captured (YES in S404), the process proceeds to S412.

In S406, the captured image acquisition unit 430 determines whether the advertisement-related location can be captured by the image capturing unit 310. The captured image acquisition unit 430 may determine whether the advertisement-related location can be captured based on the location indicated by the moving object location information and the location indicated by the advertisement-related location information. If it is determined that the image can be captured, the process proceeds to S408, and if it is determined that the image cannot be captured, the process proceeds to S412. In S408, the captured image acquisition unit 430 causes the image capturing unit 310 to capture the image.

In S410, the image information generation unit 432 generates the image information by using the captured image captured in S408. Then, the distribution information management unit 416 edits the distribution information such that the image information is included in the distribution information received in S402.

In S412, the vehicle-to-vehicle communication unit 414 and the communication relay unit 408 determine whether the distribution information can be transmitted. The vehicle-to-vehicle communication unit 414 may determine that the distribution information can be transmitted when the vehicle 300 is located in the distribution region which is indicated by the distribution region information included in the distribution information and the vehicle as a transmission destination exists. The communication relay unit 408 may determine that the distribution information can be transmitted when the vehicle 300 is located in the distribution region which is indicated by the distribution region information included in the distribution information and the communication terminal 500 as a transmission destination exists. If it is determined that the transmission is possible, the distribution information is transmitted (S414).

In S416, the communication device 400 determines whether to end the advertisement distribution process. When the determination is made not to end the process, the process returns to S404, and when the determination is made to end the process, the process is ended.

Figure 12:
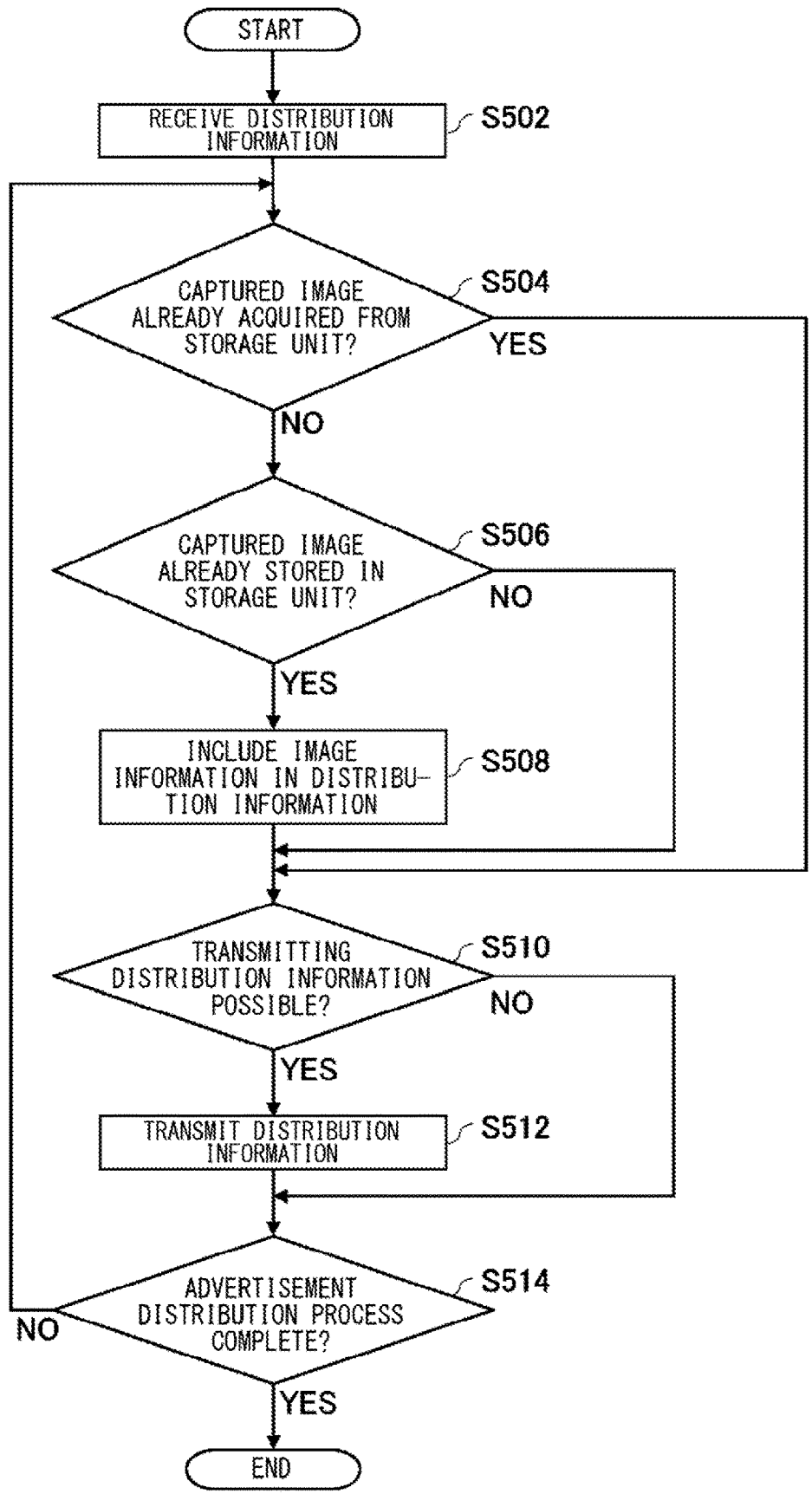
FIG. 12 shows an example of a process flow by the communication device 400.

FIG. 12 shows an example of a process flow by the communication device 400. FIG. 12 describes a flow of transmitting outside, the image information which includes at least any of the captured image obtained by capturing the location relating to the advertisement and the image-related information relating to the captured image, and the distribution information. Here, a case where the image capturing unit 310 continues to capture the image and the captured image is stored in the storage unit 402 in association with the capturing location, and the captured image acquisition unit 430 acquires, from the storage unit 402, the captured image obtained by capturing the advertisement-related location will be described.

In S502, the cellular communication unit 404 or the vehicle-to-vehicle communication unit 414 receives the distribution information. If the captured image obtained by capturing the advertisement-related location which is indicated by the base point information included in the distribution information has not yet been acquired (NO in S504), the process proceeds to S506, and if acquired (YES in S504), the process proceeds to S510.

In S506, the captured image acquisition unit 430 determines whether the captured image obtained by capturing the advertisement-related location is stored in the storage unit 402. If stored, the process proceeds to S508, and if not stored, the process proceeds to S510.

In S508, the image information generation unit 432 generates the image information by using the captured image obtained by capturing the advertisement-related location and stored in the storage unit 402. Then, the distribution information management unit 416 edits the distribution information such that the image information is included in the distribution information received in S502.

In S510, the vehicle-to-vehicle communication unit 414 and the communication relay unit 408 determine whether the distribution information can be transmitted. The vehicle-to-vehicle communication unit 414 may determine that the distribution information can be transmitted when the vehicle 300 is located in the distribution region which is indicated by the distribution region information included in the distribution information and the vehicle as a transmission destination exists. The communication relay unit 408 may determine that the distribution information can be transmitted when the vehicle 300 is located in the distribution region which is indicated by the distribution region information included in the distribution information and the communication terminal 500 as a transmission destination exists. If it is determined that the transmission is possible, the distribution information is transmitted (S512).

In S514, the communication device 400 determines whether to end the advertisement distribution process. When the determination is made not to end the process, the process returns to S504, and when the determination is made to end the process, the process is ended.

Figure 13:
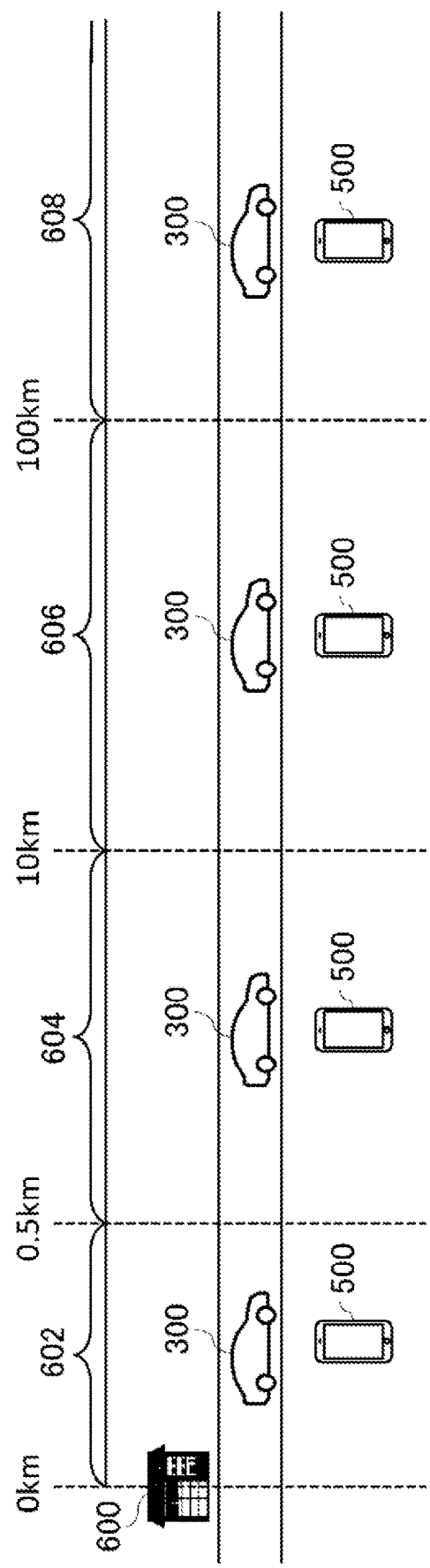
FIG. 13 schematically shows examples of a display area 602, an infection area 604, a non-infection area 606, and a sterilization area 608.

FIG. 13 schematically shows examples of a display area 602, an infection area 604, a non-infection area 606, and a sterilization area 608, with respect to an advertisement-related location 600. FIG. 13 illustrates a case where the advertisement-related location 600 is a store location of a soba restaurant which is the advertiser.

The display area 602 may be an example of the display region. The display area 602 may be an area within a predetermined range from the advertisement-related location 600. In the example shown in FIG. 13, the display area 602 is an area within a range of 0.5 km from the advertisement-related location 600. In the display area 602, the vehicle 300 is permitted to transmit the distribution information to another vehicle 300 and to transmit the distribution information to the communication terminal 500. Further, in the display area 602, the communication terminal 500 is permitted to display the stored distribution information.

The display area 602 and the infection area 604 may be an example of the distribution region. The distribution region may be an area within a predetermined range from the advertisement-related location 600. In the example shown in FIG. 13, the distribution region is an area within a range of 10 km from the advertisement-related location 600.

Forwarding of the distribution information between the vehicles may be described as infecting. The infection area 604 is an area within a predetermined range from the advertisement-related location 600, and is an area outside the display area 602. In the example shown in FIG. 13, the infection area 604 is within a range of 10 km from the advertisement-related location 600 and is an area outside the display area 602. In the infection area 604, the vehicle 300 is permitted to transmit the distribution information to another vehicle 300 and to transmit the distribution information to the communication terminal 500. Note that in the infection area 604, the vehicle 300 may be restricted from transmitting the distribution information to the communication terminal 500. In the infection area 604, the communication terminal 500 is restricted from displaying the distribution information even when the distribution information is stored. The restriction may be, for example, a prohibition.

The non-infection area 606 and the sterilization area 608 may be an example of a distribution restricted region where the forwarding of the distribution information between the vehicles is restricted. The distribution restricted region may be a region outside a predetermined range from the advertisement-related location 600. The distribution restricted region is, for example, a region outside the distribution region with respect to the advertisement-related location 600.

The non-infection area 606 is an area within a predetermined range from the advertisement-related location 600, and is an area outside the infection area 604. In the example shown in FIG. 13, the non-infection area 606 is within a range of 100 km from the advertisement-related location 600 and is an area outside the infection area 604. In the non-infection area 606, the vehicle 300 is restricted from transmitting the distribution information to another vehicle 300 and from transmitting the distribution information to the communication terminal 500. In the non-infection area 606, the communication terminal 500 is restricted from displaying the distribution information even when the distribution information is stored.

The sterilization area 608 may be an example of a discard region for discarding the distribution information. The discard region may be a region outside the distribution restricted region with respect to the advertisement-related location 600. Discarding the distribution information may be described as sterilizing. The sterilization area 608 is an area outside the non-infection area 606. In the example shown in FIG. 13, the sterilization area 608 is an area separated from the advertisement-related location 600 by 100 km or more. In the sterilization area 608, the vehicle 300 discards the distribution information when the distribution information corresponding to the advertisement-related location 600 is stored. In the sterilization area 608, the communication terminal 500 discards the distribution information when the distribution information corresponding to the advertisement-related location 600 is stored.

The restriction condition included in the distribution information may include distribution restricted region information which indicates the distribution restricted region. Further, the restriction condition included in the distribution information may include discard region information which indicates the discard region.

The vehicle-to-vehicle communication unit 414 may determine, based on the restriction condition included in the distribution information, whether to transmit the distribution information to another vehicle 300. The vehicle-to-vehicle communication unit 414 transmits the distribution information to another vehicle 300 when determining that the transmission of the distribution information to another vehicle 300 is not restricted based on the restriction condition, and the vehicle-to-vehicle communication unit 414 does not transmit the distribution information to another vehicle 300 when determining that the transmission is restricted.

For example, the vehicle-to-vehicle communication unit 414 transmits the distribution information to another vehicle 300 when the location which is indicated by the location information acquired by the location information acquisition unit 420 is not located in the distribution restricted region, and the vehicle-to-vehicle communication unit 414 does not transmit the distribution information to another vehicle 300 when the location is located in the distribution restricted region.

The communication relay unit 408 may determine, based on the restriction condition included in the distribution information, whether to transmit the distribution information to the communication terminal 500. The communication relay unit 408 transmits the distribution information to communication terminal 500 when determining that the transmission of the distribution information to the communication terminal 500 is not restricted based on the restriction condition, and the communication relay unit 408 does not transmit the distribution information to the communication terminal 500 when determining that the transmission is restricted.

For example, the communication relay unit 408 transmits the distribution information to communication terminal 500 when the location which is indicated by the location information acquired by the location information acquisition unit 420 is not located in the distribution restricted region, and the communication relay unit 408 does not transmit the distribution information to communication terminal 500 when the location is located in the distribution restricted region.

The restriction condition included in the distribution information may include display restricted region information which indicates a display restricted region where the display of the distribution information is restricted. The display restricted region may be a region outside the display region with respect to the advertisement-related location 600. The infection area 604, the non-infection area 606, and the sterilization area 608 may be examples of the display restricted region.

The display control unit 510 of the communication terminal 500 may perform control to cause the distribution information to be displayed on the display unit 520 when the location which is indicated by the location information acquired by the location information acquisition unit 508 is not included in the display restricted region, and may perform control to cause the distribution information not to be displayed on the display unit 520 when the location is included in the display restricted region.

The distribution information management unit 416 may determine, based on the discard region information included in the distribution information, whether to discard the distribution information. The distribution information management unit 416 may discard the distribution information from the storage unit 402 based on the location information acquired by the location information acquisition unit 420 and the discard region information included in the distribution information stored in the storage unit 402. The distribution information management unit 416 may be an example of a first discard execution unit.

When the location which is indicated by the location information acquired by the location information acquisition unit 420 is located in the discard region which is indicated by the discard region information included in the distribution information, for example, the distribution information management unit 416 deletes the distribution information from the storage unit 402.

The system 10 may be configured such that the distribution information infecting the vehicle 300 and the communication terminal 500 can be discarded at once. For example, the advertiser terminal 200 transmits, to the server 100, a discard instruction to discard the distribution information for which the distribution has been requested. The discard instruction may include the advertisement identification information.

The server 100 transmits the discard instruction to the vehicle 300 and the communication terminal 500. The server 100 may transmit the discard instruction to the vehicle 300 and the communication terminal 500 by the cellular communication. That is, the server 100 may transmit discard instructions to the vehicle 300 and the communication terminal 500 in each location via the network 20 and the wireless base station 30.

The distribution information management unit 416 discards, from the storage unit 402, the distribution information which includes the advertisement identification information included in the discard instruction in response to the cellular communication unit 404 receiving the discard instruction. The cellular communication unit 404 may be an example of a second receiving unit that receives the discard instruction. The distribution information management unit 416 may be an example of a second discard execution unit. The control unit of the communication terminal 500 discards, from the storage unit 502, the distribution information which includes the advertisement identification information included in the discard instruction in response to the cellular communication unit 504 receiving the discard instruction.

This makes it possible to stop the forwarding and displaying of the advertisement at once, for example, when the advertisement for which the distribution request has been made is desired to be deleted, as in a case where a soba restaurant requests an advertisement distribution for lunch service, and then the lunch service for the day is sold out. Further, by transmitting the discard instruction by the cellular communication, it is possible to cause a plurality of vehicles 300 and the communication terminals 500 to discard the distribution information in a shorter time in comparison with a case where the discard instruction is transmitted by the vehicle-to-vehicle communication.

Figure 14:
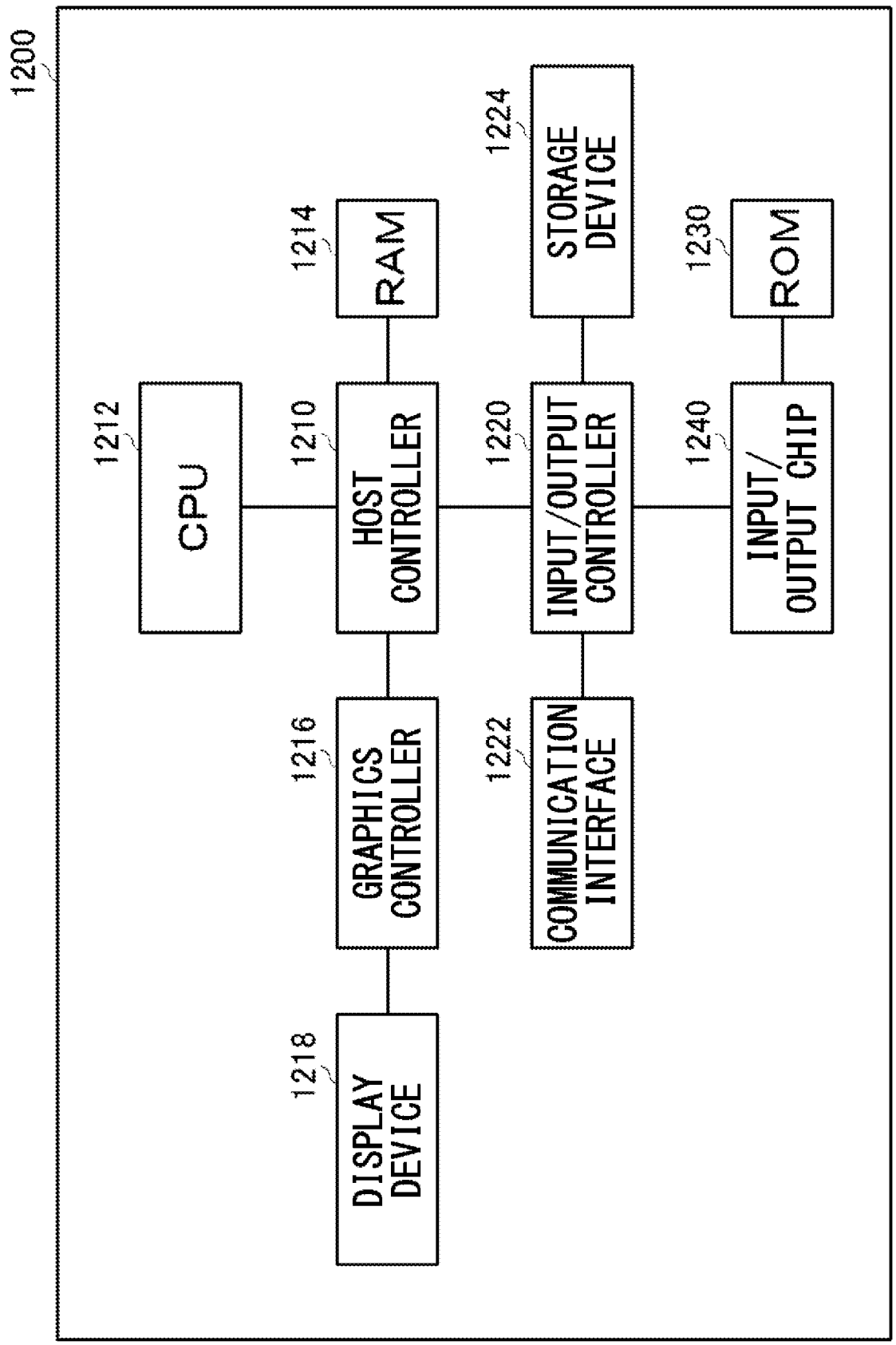
FIG. 14 schematically shows an example of a hardware configuration of a computer 1200 that functions as a server 100, the communication device 400, or a communication terminal 500.

FIG. 14 schematically shows an example of a hardware configuration of a computer 1200 that functions as a server 100, the communication device 400, or a communication terminal 500. A program installed on the computer 1200 can cause the computer 1200 to function as one or more "units" of the device according to the embodiment, or cause the computer 1200 to execute an operation or one or more "units" associated with the device according to the embodiment, and/or cause the computer 1200 to execute a process or steps of the process according to the above embodiment. Such a program may be executed by a CPU 1212 so as to cause the computer 1200 to execute the specific operation associated with some or all of the blocks of the flowchart and the block diagram described in the present specification.

The computer 1200 according to the present embodiment includes the CPU 1212, a RAM 1214, and a graphics controller 1216, which are interconnected by a host controller 1210. The computer 1200 also includes a communication interface 1222, a storage device 1224, and an input/output unit such as an IC card drive, which are connected to the host controller 1210 via an input/output controller 1220. The storage device 1224 may be a hard disk drive, a solid-state drive, and the like. The computer 1200 also includes a ROM 1230 and a legacy input/output unit such as a touch panel, which are connected to the input/output controller 1220 via an input/output chip 1240.

The CPU 1212 operates according to the programs stored in the ROM 1230 and the RAM 1214, thereby controlling each unit. The graphics controller 1216 acquires image data which is generated, by the CPU 1212, in a frame buffer or the like provided in the RAM 1214 or in itself so as to cause the image data to be displayed on a display device 1218. The computer 1200 may not include the display device 1218, and in that case, the graphics controller 1216 causes the image data to be displayed on an external display device.

The communication interface 1222 communicates with another electronic device via a wireless communication network. The storage device 1224 stores programs and data used by the CPU 1212 in the computer 1200. The IC card drive reads the program and data from an IC card, and/or writes the program and data to the IC card.

The ROM 1230 stores, in itself, a boot program or the like that is executed by the computer 1200 during activation, and/or a program that depend on hardware of the computer 1200. The input/output chip 1240 may also connect various input/output units to the input/output controller 1220 via a USB port or the like.

The program is provided by a computer-readable storage medium such as an IC card. The program is read from the computer-readable storage medium, installed in the storage device 1224, the RAM 1214, or the ROM 1230, which is also an example of the computer-readable storage medium, and executed by the CPU 1212. Information processes written in these programs are read by the computer 1200, and provides a link between the program and various types of hardware resources described above. A device or a method may be configured by implementing the operation or process of the information according to the use of the computer 1200.

For example, when a communication is executed between the computer 1200 and an external device, the CPU 1212 may execute a communication program loaded in the RAM 1214, and instruct the communication interface 1222 to process the communication based on the process written in the communication program. Under the control of the CPU 1212, the communication interface 1222 reads transmission data stored in a transmission buffer region provided in a recording medium such as the RAM 1214, the storage device 1224, or the IC card, transmits the read transmission data to the network, or writes received data which is received from the network to a receiving buffer region or the like provided on the recording medium.

Further, the CPU 1212 may execute various types of processes on the data on the RAM 1214 such that the RAM 1214 reads all or necessary parts of a file or database stored in an external recording medium such as the storage device 1224 and the IC card. Then, the CPU 1212 may write back the processed data to the external recording medium.

Various types of information such as various types of programs, data, tables, and databases may be stored in recording media and subjected to the information process. The CPU 1212 may execute various types of processes on the data read from the RAM 1214 to write back a result to the RAM 1214, the processes being described throughout the present disclosure, specified by an instruction sequence of the program, and including various types of operations, information processes, condition determinations, conditional branching, unconditional branching, information retrievals/replacements, or the like. Further, the CPU 1212 may search for information in the file, the database, or the like in the recording medium. For example, when a plurality of entries each having an attribute value of a first attribute associated with an attribute value of a second attribute are stored in the recording medium, the CPU 1212 may search, from the plurality of entries, for an entry that matches a condition in which the attribute value of the first attribute is specified, and read the attribute value of the second attribute stored in the entry, thereby acquiring the attribute value of the second attribute associated with the first attribute that satisfies a predetermined condition.

The program or software module described above may be stored on the computer 1200 or in a computer-readable storage medium near the computer 1200. Further, a recording medium such a hard disk or a RAM provided in a server system connected to a dedicated communication network or the Internet can be used as a computer-readable storage medium, thereby providing the program to the computer 1200 via the network.

Blocks in the flowcharts and block diagrams of the above described embodiment may represent steps of processes in which operations are performed or "units" of devices responsible for performing operations. Certain steps and "units" may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable storage media may include any tangible device that can store instructions for execution by a suitable device. As a result, the computer-readable storage medium having instructions stored in the tangible device comprises an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY(registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk(registered trademark), JAVA(registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., such that it is possible for a processor of a general purpose computer, special purpose computer, or other programmable data processing apparatus, or for programmable circuitry to execute the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 20: network, 30: wireless base station, 40: access point, 100: server, 200: advertiser terminal, 202: advertising base point, 204: advertising area, 210: distribution information, 220: report information, 300: vehicle, 302: vehicle location, 304: wireless communication area, 306: wireless communication area, 310: image capturing unit, 320: vehicle, 330: vehicle, 400: communication device, 402: storage unit, 404: cellular communication unit, 406: terminal communication unit, 408: communication relay unit, 410: communication control unit, 412: AP communication unit, 414: vehicle-to-vehicle communication unit, 416: distribution information management unit, 420: location information acquisition unit, 422: speed information acquisition unit, 430: captured image acquisition unit, 432: image information generation unit, 500: communication terminal, 502: storage unit, 504: cellular communication unit, 506: Wi-Fi communication unit, 508: location information acquisition unit, 510: display control unit, 520: display unit, 600: advertisement-related location, 602: display area, 604: infection area, 606: non-infection area, 608: sterilization area, 1200: computer, 1210: host controller, 1212: CPU, 1214: RAM, 1216: graphics controller, 1218: display device, 1220: input/output controller, 1222: communication interface, 1224: storage device, 1230: ROM, 1240: input/output chip

What is claimed is:

1. A communication device comprising:
a first receiving unit configured to receive distribution information from a second moving object that is different from a first moving object on which the communication device is mounted;
a storage unit configured to store the distribution information;
a transmission unit configured to transmit the distribution information to a third moving object that is different from the first moving object; and
a communication relay unit configured to relay a communication between an external terminal located outside the first moving object, and an external network, the distribution information being transmitted to the external terminal, wherein
the distribution information includes a restriction condition by which the transmission of the distribution information is restricted,
the restriction condition includes distribution restricted region information which indicates a distribution restricted region where the transmission of the distribution information by the transmission unit and the communication relay unit is restricted, the distribution restricted region where the transmission of the distribution information by the communication relay unit is closer to a location relating to an advertisement source of the distribution information than the distribution restricted region where the transmission of the distribution information by the transmission unit,
when determining that the transmission of the distribution information to the third moving object is not restricted based on the restriction condition, the transmission unit transmits the distribution information to the third moving object, and
when determining that the transmission of the distribution information to the external terminal is not restricted based on the restriction condition, the communication relay unit transmits the distribution information to the external terminal.

2. The communication device according to claim 1, comprising:
a location information acquisition unit configured to acquire moving object location information on a current location of the first moving object,
wherein and
when determining that the transmission of the distribution information to the third moving object is not restricted based on the distribution restricted region information and the moving object location information, the transmission unit transmits the distribution information to the third moving object.

3. The communication device according to claim 2,
wherein the transmission unit transmits the distribution information to the third moving object when the location indicated by the moving object location information is not located in the distribution restricted region, and the transmission unit does not transmit the distribution information to the third moving object when the location is located in the distribution restricted region.

4. The communication device according to claim 2,
wherein the distribution restricted region is a region outside a predetermined range from the location relating to the advertisement source of the distribution information.

5. The communication device according to claim 3,
wherein the distribution restricted region is a region outside a predetermined range from the location relating to the advertisement source of the distribution information.

6. The communication device according to claim 2,
wherein the restriction condition includes a discard region information which indicates a discard region where the distribution information is discarded,
the communication device comprising: a first discard execution unit configured to discard the distribution information stored in the storage unit based on the discard region information and the moving object location information.

7. The communication device according to claim 3,
wherein the restriction condition includes a discard region information which indicates a discard region where the distribution information is discarded,
the communication device comprising: a first discard execution unit configured to discard the distribution information stored in the storage unit based on the discard region information and the moving object location information.

8. The communication device according to claim 6, wherein
the distribution restricted region is a region outside a predetermined range from a location relating to an advertisement source of the distribution information, and
the discard region is a region outside the distribution restricted region with respect to the location relating to the advertisement source of the distribution information.

9. The communication device according to claim 1, comprising:
a second receiving unit configured to receive a discard instruction for discarding the distribution information received by the first receiving unit; and
a second discard execution unit configured to discard the distribution information stored in the storage unit, in response to the second receiving unit receiving the discard instruction.

10. The communication device according to claim 2, comprising:
a second receiving unit configured to receive a discard instruction for discarding the distribution information received by the first receiving unit; and
a second discard execution unit configured to discard the distribution information stored in the storage unit, in response to the second receiving unit receiving the discard instruction.

11. The communication device according to claim 9, wherein
the external network includes a cellular network, and
the second receiving unit receives the discard instruction via the external network by a cellular communication.

12. The communication device according to claim 1, wherein
the first receiving unit receives the distribution information from the second moving object via a communication between moving objects, and
the transmission unit transmits the distribution information to the third moving object via the communication between moving objects.

13. The communication device according to claim 2, wherein
the first receiving unit receives the distribution information from the second moving object via a communication between moving objects, and
the transmission unit transmits the distribution information to the third moving object via the communication between moving objects.

14. The communication device according to claim 1, wherein the first moving object, the second moving object, and the third moving object are vehicles.

15. The communication device according to claim 2, wherein the first moving object, the second moving object, and the third moving object are vehicles.

16. A non-transitory computer-readable storage medium that stores a program to cause a computer to function as a communication device, the communication device including:

a first receiving unit configured to receive distribution information from a second moving object that is different from a first moving object on which the communication device is mounted;
a storage unit configured to store the distribution information;
a transmission unit configured to transmit the distribution information to a third moving object that is different from the first moving object; and
a communication relay unit configured to relay a communication between an external terminal located outside the first moving object, and an external network, the distribution information being transmitted to the external terminal, wherein
the distribution information includes a restriction condition by which the transmission of the distribution information is restricted,
the restriction condition includes distribution restricted region information which indicates a distribution restricted region where the transmission of the distribution information by the transmission unit and the communication relay unit is restricted,
the distribution restricted region where the transmission of the distribution information by the communication relay unit is closer to a location relating to an advertisement source of the distribution information than the distribution restricted region where the transmission of the distribution information by the transmission unit,
when determining that the transmission of the distribution information to the third moving object is not restricted based on the restriction condition, the transmission unit transmits the distribution information to the third moving object, and
when determining that the transmission of the distribution information to the external terminal is not restricted based on the restriction condition, the communication relay unit transmits the distribution information to the external terminal.

17. A system comprising:
the communication device according to claim 1; and
the external terminal.

18. The system according to claim 17, wherein
the distribution information includes display restricted region information which indicates a display restricted region where a display of the distribution information is restricted, and
the external terminal includes a display control unit configured to perform control to cause the distribution information to be displayed on a display unit of the external terminal when a location of the external terminal is not included in the display restricted region, and to perform control to cause the distribution information not to be displayed on the display unit when the location is included in the display restricted region.

* * * * *